(12) United States Patent
Balteanu et al.

(10) Patent No.: US 11,848,713 B2
(45) Date of Patent: Dec. 19, 2023

(54) ENVELOPE ALIGNMENT CALIBRATION IN RADIO FREQUENCY SYSTEMS

(71) Applicant: Skyworks Solutions, Inc., Irvine, CA (US)

(72) Inventors: Florinel G. Balteanu, Irvine, CA (US); Yu Zhu, Wellesley, MA (US); Paul T. DiCarlo, Marlborough, MA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 18/174,935

(22) Filed: Feb. 27, 2023

(65) Prior Publication Data

US 2023/0283388 A1    Sep. 7, 2023

Related U.S. Application Data

(63) Continuation of application No. 17/449,511, filed on Sep. 30, 2021, now Pat. No. 11,626,933, which is a continuation of application No. 16/946,844, filed on Jul. 8, 2020, now Pat. No. 11,165,514.

(60) Provisional application No. 62/871,881, filed on Jul. 9, 2019.

(51) Int. Cl.
| | | |
|---|---|---|
| *H04B 17/12* | (2015.01) | |
| *H04B 17/21* | (2015.01) | |
| *H04B 17/14* | (2015.01) | |
| *H04B 17/327* | (2015.01) | |
| *H04B 17/364* | (2015.01) | |

(52) U.S. Cl.
CPC ............ *H04B 17/12* (2015.01); *H04B 17/14* (2015.01); *H04B 17/21* (2015.01); *H04B 17/327* (2015.01); *H04B 17/364* (2015.01)

(58) Field of Classification Search
CPC .......... H03F 1/0222; H03F 1/025; H03F 1/32; H03F 2201/3227; H04B 17/13; H04B 17/11; H04B 17/12; H04B 17/14; H04B 17/21; H04B 17/327; H04B 17/364; H04B 1/0458; H04B 1/1027; H04B 2001/0408
See application file for complete search history.

(56) References Cited

U.S. PATENT DOCUMENTS

| | | |
|---|---|---|
| 7,496,339 B2 | 2/2009 | Balteanu et al. |
| 8,493,142 B2 | 7/2013 | Tadano |
| 8,718,188 B2 | 5/2014 | Balteanu et al. |
| 8,786,371 B2 | 7/2014 | Popplewell et al. |
| 8,981,847 B2 | 3/2015 | Balteanu |
| 8,989,682 B2 | 3/2015 | Ripley et al. |
| 9,092,393 B2 | 7/2015 | Whitefield et al. |
| 9,118,277 B2 | 8/2015 | Balteanu et al. |

(Continued)

*Primary Examiner* — Khanh C Tran
(74) *Attorney, Agent, or Firm* — Knobbe, Martens, Olson & Bear, LLP

(57) ABSTRACT

Apparatus and methods for envelope alignment calibration in radio frequency (RF) systems are provided. In certain embodiments, calibration is performed by providing an envelope signal that is substantially triangular along an envelope path, and by providing an RF signal to a power amplifier along an RF signal path. Additionally, an output of the power amplifier is observed to generate an observation signal using an observation receiver. The observation signal includes a first peak and a second peak, and a delay between the envelope signal and the RF signal is controlled based on relative size of the peaks of the observation signal to one another.

20 Claims, 21 Drawing Sheets

(56) References Cited

U.S. PATENT DOCUMENTS

| | | |
|---|---|---|
| 9,143,096 B2 | 9/2015 | Balteanu et al. |
| 9,189,430 B2 | 11/2015 | Ross et al. |
| 9,197,128 B2 | 11/2015 | Popplewell et al. |
| 9,294,054 B2 | 3/2016 | Balteanu et al. |
| 9,445,371 B2 | 9/2016 | Khesbak et al. |
| 9,516,693 B2 | 12/2016 | Khlat et al. |
| 9,584,070 B2 | 2/2017 | Balteanu et al. |
| 9,606,947 B2 | 3/2017 | Ross et al. |
| 9,668,215 B2 | 5/2017 | Balteanu et al. |
| 9,673,707 B2 | 6/2017 | Popplewell et al. |
| 9,806,676 B2 | 10/2017 | Balteanu et al. |
| 9,831,834 B2 | 11/2017 | Balteanu et al. |
| 9,876,473 B2 | 1/2018 | Khesbak et al. |
| 9,893,682 B2 | 2/2018 | Zhu et al. |
| 9,935,582 B2 | 4/2018 | Balteanu et al. |
| 9,948,241 B2 | 4/2018 | Popplewell et al. |
| 9,990,322 B2 | 6/2018 | Whitefield et al. |
| 9,991,856 B2 | 6/2018 | Khesbak et al. |
| 10,080,192 B2 | 9/2018 | Balteanu et al. |
| 10,110,169 B2 | 10/2018 | Khesbak et al. |
| 10,164,582 B2 | 12/2018 | Zhu et al. |
| 10,181,820 B2 | 1/2019 | Balteanu et al. |
| 10,270,394 B2 | 4/2019 | Drogi et al. |
| 10,277,177 B2 | 4/2019 | Khesbak et al. |
| 10,333,470 B2 | 6/2019 | Balteanu et al. |
| 10,454,432 B2 | 10/2019 | Soliman |
| 11,165,514 B2 | 11/2021 | Balteanu et al. |
| 11,431,357 B2 | 8/2022 | Balteanu et al. |
| 11,626,933 B2 | 4/2023 | Balteanu et al. |
| 2003/0234688 A1 | 12/2003 | Matsuyoshi et al. |
| 2012/0200354 A1 | 8/2012 | Ripley et al. |
| 2012/0313701 A1* | 12/2012 | Khlat ............... H02M 3/07 330/127 |
| 2013/0034139 A1* | 2/2013 | Khlat ............... H03F 1/0227 375/224 |
| 2013/0182804 A1 | 7/2013 | Yutaka et al. |
| 2014/0049311 A1 | 2/2014 | Yang et al. |
| 2014/0055197 A1* | 2/2014 | Khlat ............... H03F 3/45663 330/127 |
| 2014/0057684 A1* | 2/2014 | Khlat ............... H03F 3/505 455/574 |
| 2014/0062590 A1* | 3/2014 | Khlat ............... H03F 1/0227 330/127 |
| 2014/0085008 A1* | 3/2014 | Cohen ............... B82Y 40/00 330/297 |
| 2014/0191797 A1 | 7/2014 | Fleischer |
| 2014/0327483 A1 | 11/2014 | Balteanu |
| 2015/0042406 A1 | 2/2015 | Kovac et al. |
| 2015/0054594 A1 | 2/2015 | Apriyana et al. |
| 2015/0270806 A1 | 9/2015 | Wagh et al. |
| 2017/0012606 A1 | 1/2017 | Allen |
| 2017/0228332 A1 | 8/2017 | Ross et al. |
| 2018/0138862 A1 | 5/2018 | Balteanu et al. |
| 2018/0152945 A1 | 5/2018 | Balteanu |
| 2018/0159476 A1 | 6/2018 | Balteanu et al. |
| 2018/0159478 A1 | 6/2018 | Balteanu et al. |
| 2018/0183387 A1 | 6/2018 | Schemmann et al. |
| 2018/0241347 A1 | 8/2018 | Petrovic et al. |
| 2018/0294776 A1 | 10/2018 | Popplewell et al. |
| 2018/0351454 A1 | 12/2018 | Khesbak et al. |
| 2018/0375476 A1 | 12/2018 | Balteanu et al. |
| 2018/0375483 A1 | 12/2018 | Balteanu et al. |
| 2019/0020315 A1 | 1/2019 | Khesbak et al. |
| 2019/0123690 A1 | 4/2019 | Balteanu et al. |
| 2019/0190462 A1 | 6/2019 | Zhu et al. |
| 2019/0341888 A1 | 11/2019 | Drogi et al. |
| 2019/0372526 A1 | 12/2019 | Balteanu et al. |
| 2020/0067406 A1 | 2/2020 | Khesbak et al. |
| 2020/0099343 A1 | 3/2020 | Khesbak et al. |
| 2020/0127619 A1 | 4/2020 | Khesbak et al. |
| 2020/0154434 A1 | 5/2020 | Balteanu |
| 2020/0162028 A1 | 5/2020 | Balteanu et al. |
| 2020/0162030 A1 | 5/2020 | Drogi et al. |
| 2020/0259458 A1 | 8/2020 | Balteanu et al. |
| 2020/0259459 A1 | 8/2020 | Balteanu et al. |
| 2020/0313622 A1 | 10/2020 | Eichler et al. |
| 2020/0336110 A1 | 10/2020 | Drogi et al. |
| 2023/0082437 A1 | 3/2023 | Balteanu et al. |

* cited by examiner

ENVELOPE ALIGNMENT CALIBRATION IN RADIO FREQUENCY SYSTEMS

CROSS-REFERENCE TO RELATED APPLICATIONS

This application is a continuation of U.S. application Ser. No. 17/449,511, filed Sep. 30, 2021 and titled "ENVELOPE ALIGNMENT CALIBRATION IN RADIO FREQUENCY SYSTEMS," which is a continuation of U.S. application Ser. No. 16/946,844, filed Jul. 8, 2020 and titled "ENVELOPE ALIGNMENT CALIBRATION IN RADIO FREQUENCY SYSTEMS," which claims the benefit of priority under 35 U.S.C. § 119 of U.S. Provisional Patent Application No. 62/871,881, filed Jul. 9, 2019 and titled "ENVELOPE ALIGNMENT CALIBRATION IN RADIO FREQUENCY SYSTEMS," each of which is herein incorporated by reference in its entirety.

BACKGROUND

Field

Embodiments of the invention relate to electronic systems, and in particular, to power amplifiers for radio frequency electronics.

Description of the Related Technology

Radio frequency (RF) communication systems can be used for transmitting and/or receiving signals of a wide range of frequencies. For example, an RF communication system can be used to wirelessly communicate RF signals in a frequency range of about 30 kHz to 300 GHz, such as in the range of about 410 MHz to about 7.125 GHz for fifth generation (5G) communications using Frequency Range 1 (FR1).

Examples of RF communication systems include, but are not limited to, mobile phones, tablets, base stations, network access points, customer-premises equipment (CPE), laptops, and wearable electronics.

SUMMARY

In certain embodiments, the present disclosure relates to a method of calibrating for envelope alignment. The method includes providing an envelope signal with a peak along an envelope path to an envelope controlled circuit, providing a radio frequency signal with a first pair of peaks to a power amplifier along a radio frequency signal path, observing an output of the power amplifier to generate an observation signal including a second pair of peaks corresponding to the first pair of peaks of the radio frequency signal, and calibrating a delay between the envelope signal and the radio frequency signal based on comparing a size of a first peak of the second pair of peaks to a size of a second peak of the second pair of peaks.

In various embodiments, the method further includes changing the delay until the size of the first peak is substantially equal to the size of the second peak.

In several embodiments, calibrating the delay includes controlling a delay of a controllable delay circuit along the envelope path.

In some embodiments, the method further includes observing the output of the power amplifier after a duplexer.

In a number of embodiments, calibrating the delay includes programming calibration data into a memory.

In various embodiments, the envelope controlled circuit includes a charge pump. According to several embodiments, the method further includes generating a regulated voltage based on the envelope signal using the charge pump, providing a radio frequency output signal from the output of the power amplifier to a radio frequency switch, and controlling a turn on voltage of the radio frequency switch using the regulated voltage.

In a number of embodiments, the envelope controlled circuit includes an envelope tracker. According to some embodiments, the method further includes changing a supply voltage of the power amplifier in relation to the envelope signal using the envelope tracker. In accordance with several embodiments, the envelope controlled circuit further includes a charge pump, the method further including controlling a delay between the envelope signal arriving to the charge pump and the envelope signal arriving to the envelope tracker using a controllable delay circuit. According to various embodiments, the method further includes increasing a channel capacity of the radio frequency signal path by calibrating a delay between the envelope signal and the radio frequency signal.

In several embodiments, the envelope signal for calibrating for envelope alignment is substantially triangular, the peak of the envelope signal corresponding to a peak of a triangle.

In some embodiments, the first pair of peaks are each of substantially equal in size.

In various embodiments, the radio frequency signal for calibrating for envelope alignment is substantially triangular, the first pair of peaks of the radio frequency signal corresponding to peaks of a pair of triangles.

In a number of embodiments, the method further includes observing the output of the power amplifier after a filter, and calibrating a transceiver to compensate for the filter.

In certain embodiments, the present disclosure relates to a mobile device. The mobile device includes a front end system including an envelope controlled circuit and a power amplifier, a baseband processor configured to provide an envelope signal with a peak along an envelope path to the envelope controlled circuit, and a transceiver configured to provide a radio frequency signal with a first pair of peaks to the power amplifier along a radio frequency signal path, the transceiver including an observation receiver configured to process an observation signal captured from an output of the power amplifier, the observation signal including a second pair of peaks corresponding to the first pair of peaks of the radio frequency signal, the observation receiver further configured to generate calibration data based on comparing a size of a first peak of the second pair of peaks relative to a size of a second peak of the second pair of peaks, the calibration data operable to calibrate a delay between the envelope signal and the radio frequency signal.

In various embodiments, the transceiver is further configured to control the delay until the size of the first peak is substantially equal to the size of the second peak.

In a number of embodiments, the front end system further includes a controllable delay circuit along the envelope path, the calibration data operable to control a delay of the controllable delay circuit.

In several embodiments, the front end system further includes a duplexer, the observation signal generated after the duplexer.

In various embodiments, the front end system includes a directional coupler configured to generate the observation signal.

In a number of embodiments, the mobile device further includes a memory storing the calibration data.

In some embodiments, the envelope controlled circuit includes a charge pump. According to various embodiments, the charge pump is configured to generate a regulated voltage based on the envelope signal, the front end system further including a radio frequency switch configured to receive a radio frequency output signal from the output of the power amplifier and having a turn on voltage controlled by the regulated voltage.

In various embodiments, the envelope controlled circuit includes an envelope tracker. According to a number of embodiments, the envelope tracker is configured to change a supply voltage of the power amplifier in relation to the envelope signal. In accordance with several embodiments, the envelope controlled circuit further includes a charge pump, the front end circuit further including a controllable delay circuit operable to control a delay between the envelope signal arriving to the charge pump and the envelope signal arriving to the envelope tracker.

In a number of embodiments, the envelope signal for calibrating for envelope alignment is substantially triangular, the peak of the envelope signal corresponding to a peak of a triangle.

In several embodiments, the first pair of peaks are each of substantially equal in size.

In various embodiments, the radio frequency signal for calibrating for envelope alignment is substantially triangular, the first pair of peaks of the radio frequency signal corresponding to peaks of a pair of triangles.

In certain embodiments, the present disclosure relates to a radio frequency front end system. The radio frequency front end system includes an envelope controlled circuit configured to receive an envelope signal with a peak along an envelope path, a power amplifier configured to receive a radio frequency signal with a first pair of peaks along a radio frequency signal path, a directional coupler configured to generate an observation signal based on observing an output of the power amplifier, the observation signal including a second pair of peaks corresponding to the first pair of peaks of the radio frequency signal, and an observation receiver configured to process the observation signal to generate calibration data based on comparing a size of a first peak of the second pair of peaks relative to a size of a second peak of the second pair of peaks, the calibration data operable to calibrate a delay between the envelope signal and the radio frequency signal.

In various embodiments, the transceiver is further configured to control the delay until the size of the first peak is substantially equal to the size of the second peak. According to a number of embodiments, the radio frequency front end system further includes a controllable delay circuit along the envelope path, the calibration data operable to control a delay of the controllable delay circuit.

In several embodiments, the radio frequency front end system further includes a duplexer, the observation signal generated after the duplexer.

In a number of embodiments, the radio frequency front end system further includes a memory storing the calibration data.

In various embodiments, the envelope controlled circuit includes a charge pump. According to several embodiments, the charge pump is configured to generate a regulated voltage based on the envelope signal, the radio frequency front end system further including a radio frequency switch configured to receive a radio frequency output signal from the output of the power amplifier and having a turn on voltage controlled by the regulated voltage.

In a number of embodiments, the envelope controlled circuit includes an envelope tracker. According to some embodiments, the envelope tracker is configured to change a supply voltage of the power amplifier in relation to the envelope signal. In accordance with various embodiments, the envelope controlled circuit further includes a charge pump, the front end circuit further including a controllable delay circuit operable to control a delay between the envelope signal arriving to the charge pump and the envelope signal arriving to the envelope tracker.

In several embodiments, the envelope signal for calibrating for envelope alignment is substantially triangular, the peak of the envelope signal corresponding to a peak of a triangle.

In some embodiments, the first pair of peaks are each of substantially equal in size.

In various embodiments, the radio frequency signal for calibrating for envelope alignment is substantially triangular, the first pair of peaks of the radio frequency signal corresponding to peaks of a pair of triangles.

DETAILED DESCRIPTION OF EMBODIMENTS

Figure 1:
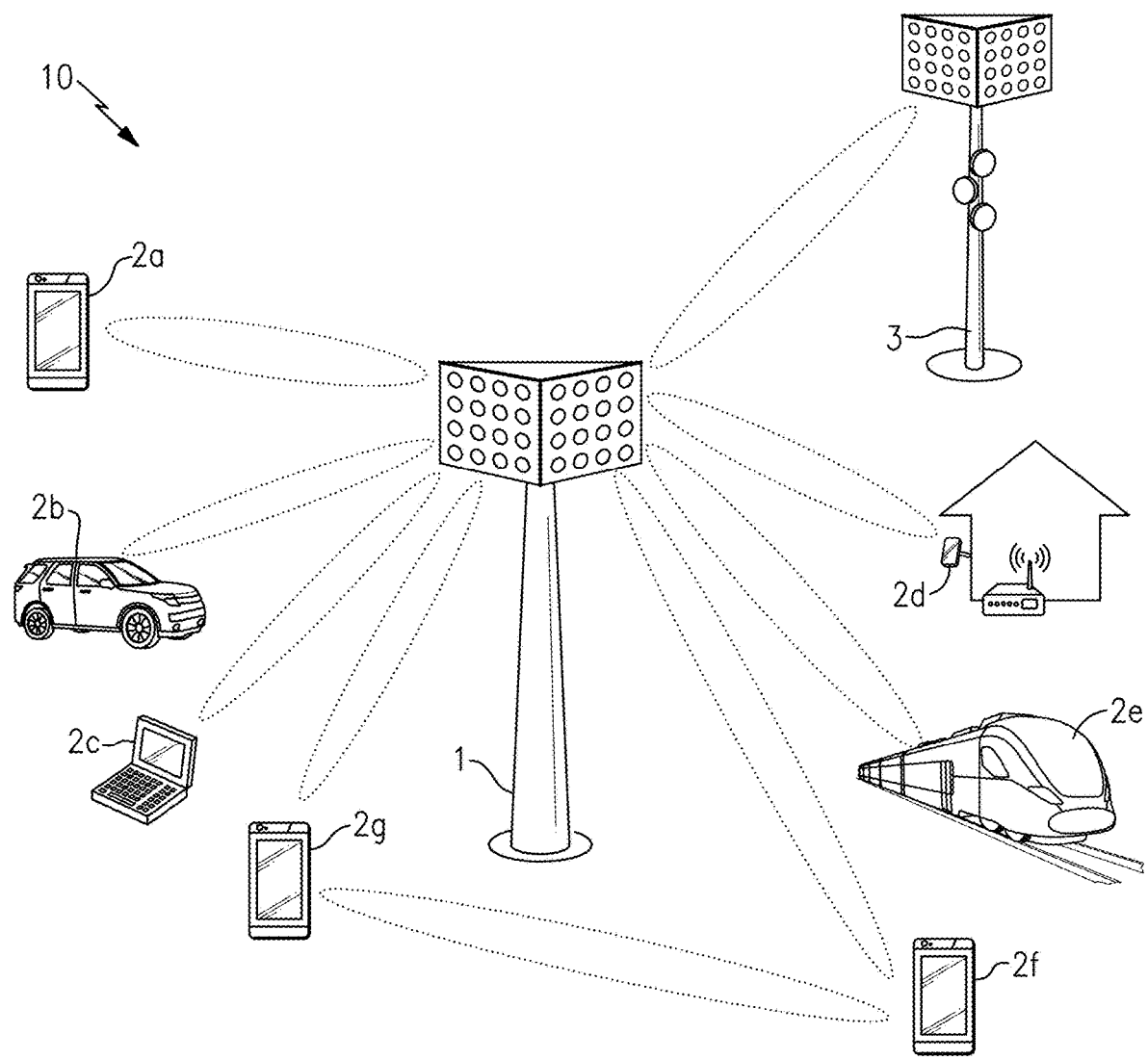
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and plans to introduce Phase 2 of 5G technology in Release 16. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul.

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof.

For example, 5G NR can operate with different specifications across frequency bands for 5G, including with flexible numerology compared with fixed numerology for 4G. FR1 includes existing and new bands and corresponds to 450 MHz-6 GHz; sub-6 GHz bands with numerology subcarrier spacing of 15 kHz, 30 kHz and 60 kHz. Additionally, FR2 includes new bands and corresponds to millimeter wave frequencies of 24.25 GHz-52.6 GHz with numerology subcarrier spacing of 60 kHz, 120 kHz and 240 kHz to be able to handle higher phase noise and Doppler effects (for instance, for train applications up to 500 km/h).

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz. In one embodiment, one or more of the mobile devices support a HPUE power class specification.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
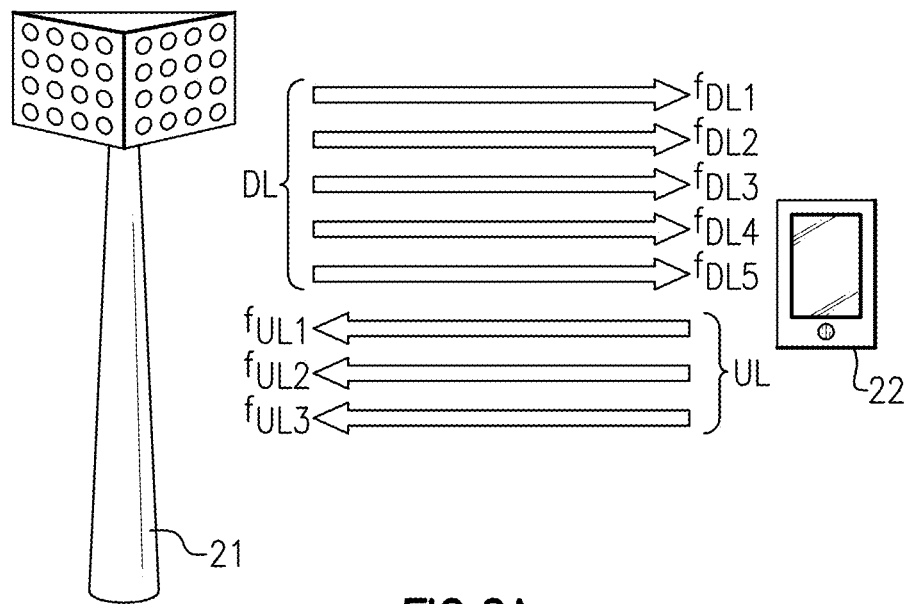
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
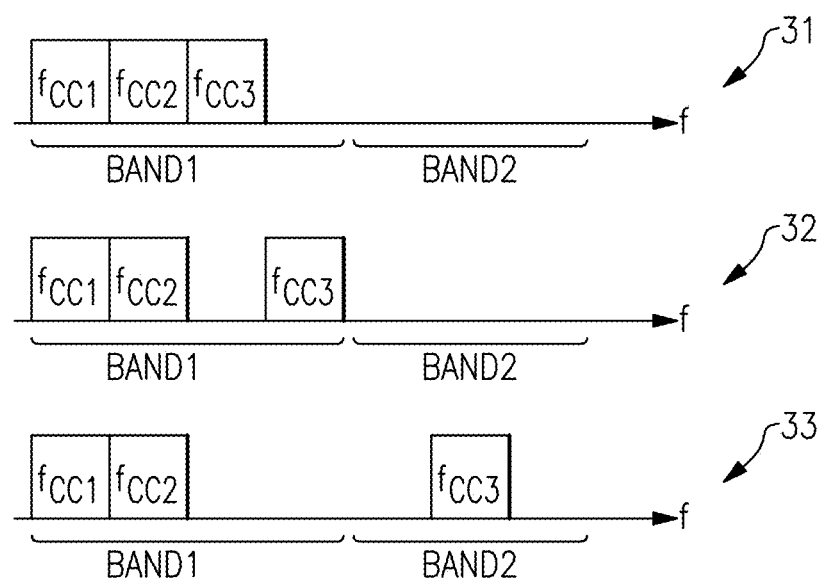
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
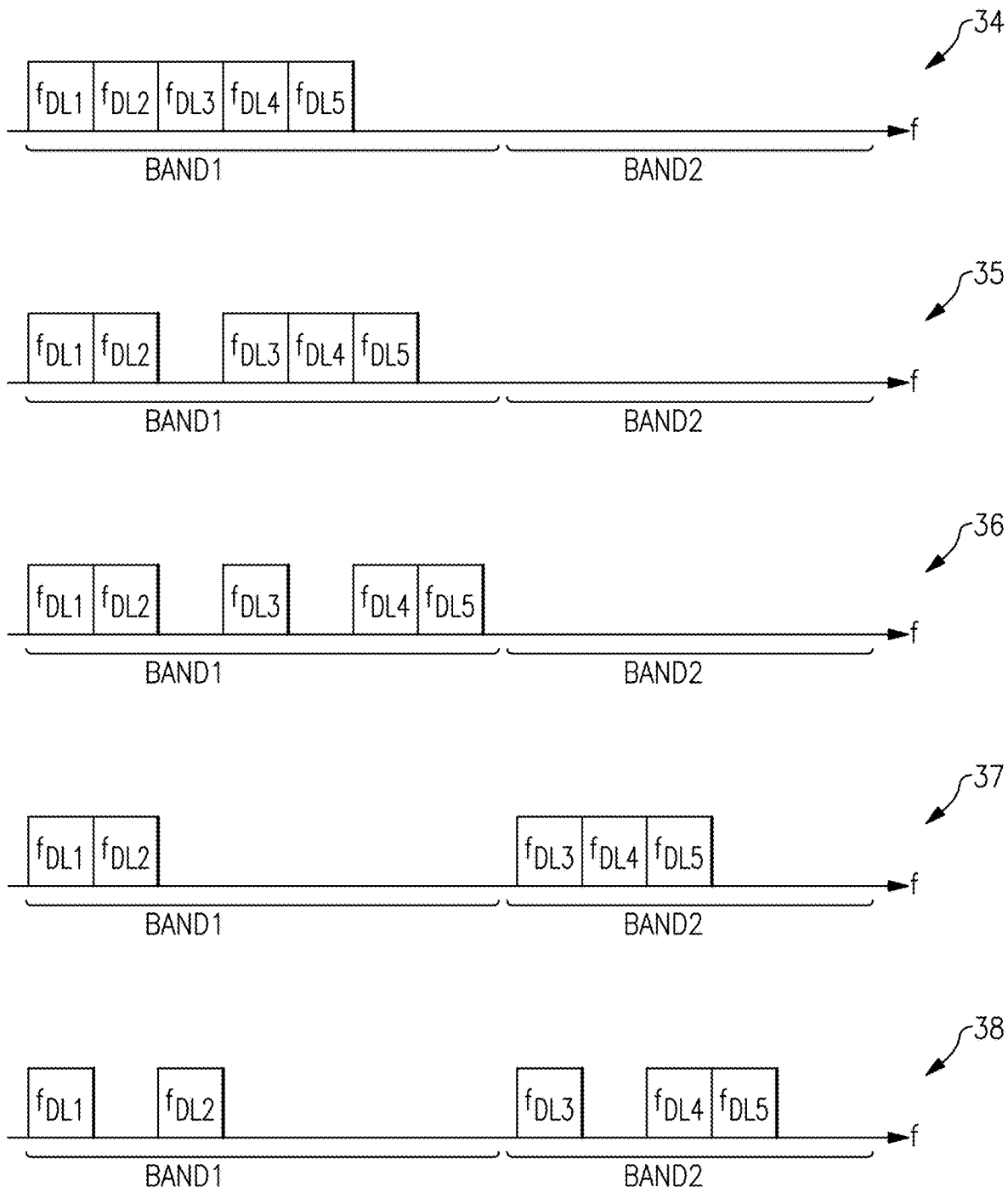
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and second cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink.

Figure 3A:
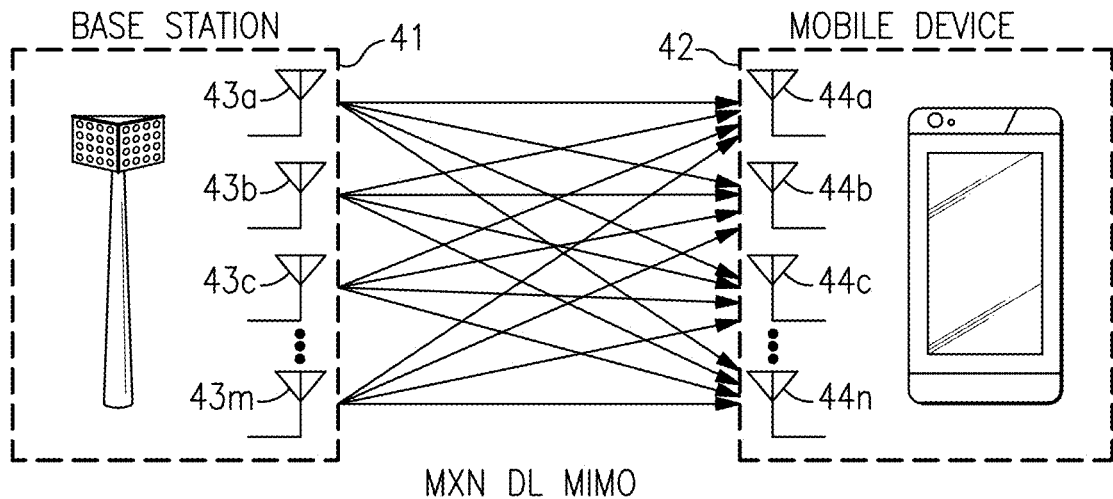
FIG. 3A is a schematic diagram of one example of a downlink channel using multi-input and multi-output (MIMO) communications.
Figure 3B:
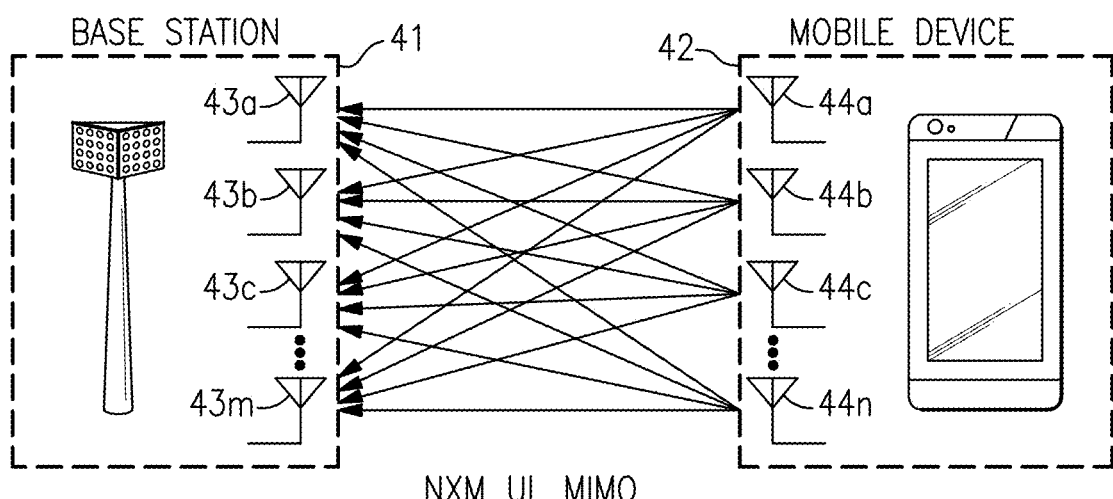
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 3B illustrates an example of n×m UL MIMO.

By increasing the level or order of MIMO, data bandwidth of an uplink channel and/or a downlink channel can be increased.

MIMO communications are applicable to communication links of a variety of types, such as FDD communication links and TDD communication links.

Figure 3C:
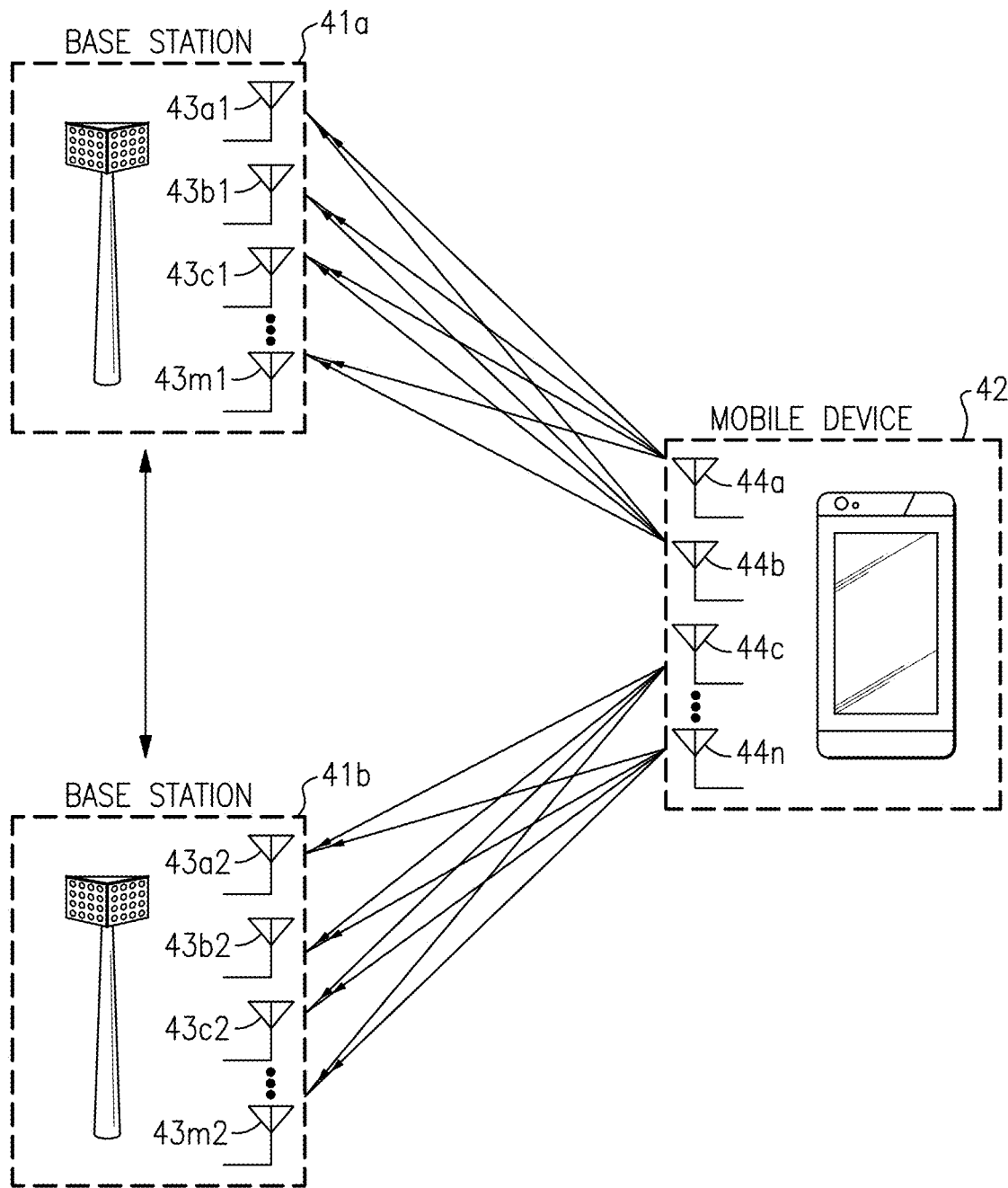
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44a, 44b, 44c, . . . 44n of the mobile device 42. Additional a first portion of the uplink transmissions are received using M antennas 43a1, 43b1, 43c1, . . . 43m1 of a first base station 41a, while a second portion of the uplink transmissions are received using M antennas 43a2, 43b2, 43c2, . . . 43m2 of a second base station 41b. Additionally, the first base station 41a and the second base station 41b communication with one another over wired, optical, and/or wireless links.

The MIMO scenario of FIG. 3C illustrates an example in which multiple base stations cooperate to facilitate MIMO communications.

Examples of Envelope Controlled Radio Frequency Switches

Envelope tracking (ET) is a technique that can be used to increase power added efficiency (PAE) of a power amplifier by efficiently controlling a voltage level of a power amplifier supply voltage in relation to an envelope of a radio frequency (RF) signal amplified by the power amplifier. Thus, when the envelope of the RF signal increases, the voltage supplied to the power amplifier can be increased. Likewise, when the envelope of the RF signal decreases, the voltage supplied to the power amplifier can be decreased to reduce power consumption.

In certain embodiments herein, a power amplifier provides an RF signal to an antenna by way of an RF switch. Additionally, the envelope signal is used not only to control a power amplifier supply voltage of the power amplifier, but also to control a regulated voltage used to turn on the RF switch. For example, a level shifter can use a regulated voltage from charge pump circuitry to turn on the RF switch, and the envelope signal can be provided to the charge pump circuitry and used to control the voltage level of the regulated voltage over time.

By using envelope tracking information to change the regulated voltage in this manner, the turn-on voltage of the RF switch tracks instantaneous RF signal power. Thus, when the power of the RF signal increases (as indicated by the envelope signal), the charge pump circuitry provides a corresponding change to the regulated voltage and thus to the turn-on voltage of the RF switch.

Implementing the turn-on voltage of the RF switch to track the envelope signal provides a number of advantages, such as lower insertion loss, decreased on-state resistance, higher linearity, increased capacity, and/or superior third-order input intercept point (IIP3).

Figure 4:
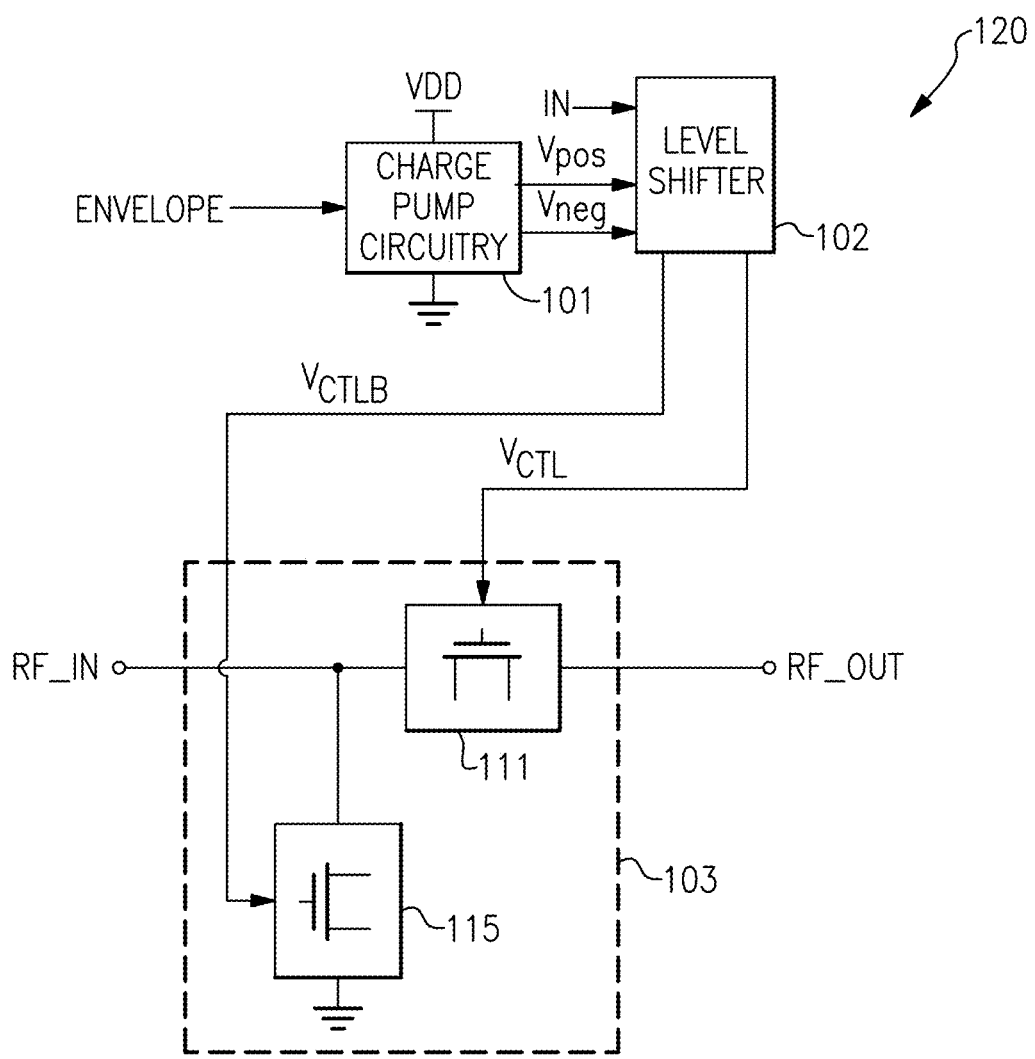
FIG. 4 is a schematic diagram of a radio frequency (RF) switch system according to one embodiment.

FIG. 4 is a schematic diagram of an RF switch system 120 according to one embodiment. The RF switch system 120 includes charge pump circuitry 101, a level shifter 102, and an RF switch network 103.

In the illustrated embodiment, the RF switch network 103 includes a series transistor switch 111 and a shunt transistor switch 115. As shown in FIG. 4, the series transistor switch 111 is electrically connected between an RF input terminal RF_IN and an RF output terminal RF_OUT, and the shunt transistor switch 115 is electrically connected between the RF input terminal RF_IN and ground. Although one example of an RF switch network is shown, charge pumps can generate regulated voltages for controlling a wide variety of types of RF switch networks.

A power amplifier (not shown in FIG. 4) provides an RF signal to the RF input terminal (RF_IN). In certain implementations, a power amplifier supply voltage of the power amplifier is controlled by an envelope tracker that also receives the envelope signal ENVELOPE.

As shown in FIG. 4, the charge pump circuitry 101 receives power by way of a supply voltage VDD and ground, and operates to generate a positive regulated voltage Vpos having a voltage level above the supply voltage VDD and a negative regulated voltage Vneg having a voltage level below ground.

The charge pump circuitry 101 also receives an envelope signal ENVELOPE that indicates an envelope of the RF signal received at the RF input terminal RF_IN. The charge pump circuitry 101 processes the envelope signal ENVELOPE to control generation of one or more regulated voltages. For example, in certain implementations, the charge pump circuitry 101 generates the positive regulated voltage $V_{pos}$ to track or change with the envelope signal ENVELOPE.

The level shifter 102 receives an input control signal IN for controlling a state of the RF switch network 103. In this example, the level shifter 102 generates a switch control voltage $V_{CTL}$ for controlling the series transistor switch 111 and an inverted switch control voltage $V_{CTLB}$ for controlling the shunt transistor switch 115.

In certain implementations, the level shifter 102 uses the positive regulated voltage $V_{pos}$ to generate the switch control voltage $V_{CTL}$ in a first state of the input control signal IN, and uses the negative regulated voltage $V_{neg}$ to generate the switch control voltage $V_{CTL}$ in a second state of the input control signal IN. Additionally, the level shifter 102 uses the negative regulated voltage $V_{neg}$ to generate the inverted switch control voltage $V_{CTLB}$ in the first state of the input control signal IN, and uses the positive regulated voltage $V_{pos}$ to generate the inverted switch control voltage $V_{CTLB}$ in the second state of the input control signal IN.

Thus, the positive regulated voltage $V_{pos}$ and the negative regulated voltage $V_{neg}$ are used to control the voltage levels of the switch control voltage $V_{CTL}$ and the inverted switch control voltage $V_{CTLB}$ based on the state of the input control signal IN. Additionally, the switch control voltage $V_{CTL}$ and the inverted switch control voltage $V_{CTLB}$ are inverted or complementary with respect to one another, in this embodiment.

In certain implementations, the charge pump circuitry 101 uses the envelope signal ENVELOPE to control the positive regulated voltage $V_{pos}$. Thus, when the level shifter 102 sets the switch control voltage $V_{CTL}$ be about equal to the positive regulated voltage $V_{pos}$, the switch control voltage $V_{CTL}$ tracks or changes with the envelope signal ENVELOPE.

Implementing the RF switch system 120 in this manner provides a number of advantages, including, but not limited to, lower insertion loss, decreased on-state resistance, higher linearity, increased capacity, and/or superior IIP3.

For instance, in one example, insertion loss (IL) of a transistor switch is given by Equation 1 below, where Ron is the on-state resistance of the transistor switch, Coff is the off-state capacitance of the transistor switch, and Zo is the termination impedance of the transistor switch.

$$IL = 10\log\left[\left(1 + \frac{Ron}{2Zo}\right)^2 + \left(\frac{2\pi Coff(Ron+Zo)}{2}\right)^2\right] \quad \text{Equation 1}$$

Additionally, in this example, third-order input intercept point (IIP3) of the transistor switch is given by Equation 2 below, where Isat is the saturation current of the transistor switch, Ron is the on-state resistance of the transistor switch, and Zo is the termination impedance of the transistor switch.

$$IIP3 = 10\log\left(\frac{Isat^2(Ron+2Zo)^4}{4RonZo^2}\right) + 30 \quad \text{Equation 2}$$

Furthermore, in this example, on-state resistance (Ron) of the transistor switch is given by Equation 3 below, where w is the width of the transistor switch, l is the channel length of the transistor switch, μ is the channel carrier mobility of the transistor switch, Cox is the capacitance density associated with the gate dielectric of the transistor switch when turned on, Vth is the threshold voltage of the transistor switch, n is a scaling factor, and Vpos is the voltage level of the positive regulated voltage used to turn on the transistor switch.

$$Ron = n\frac{1}{\mu Cox \frac{w}{l}(Vpos - Vth)} \quad \text{Equation 3}$$

Figure 5A:
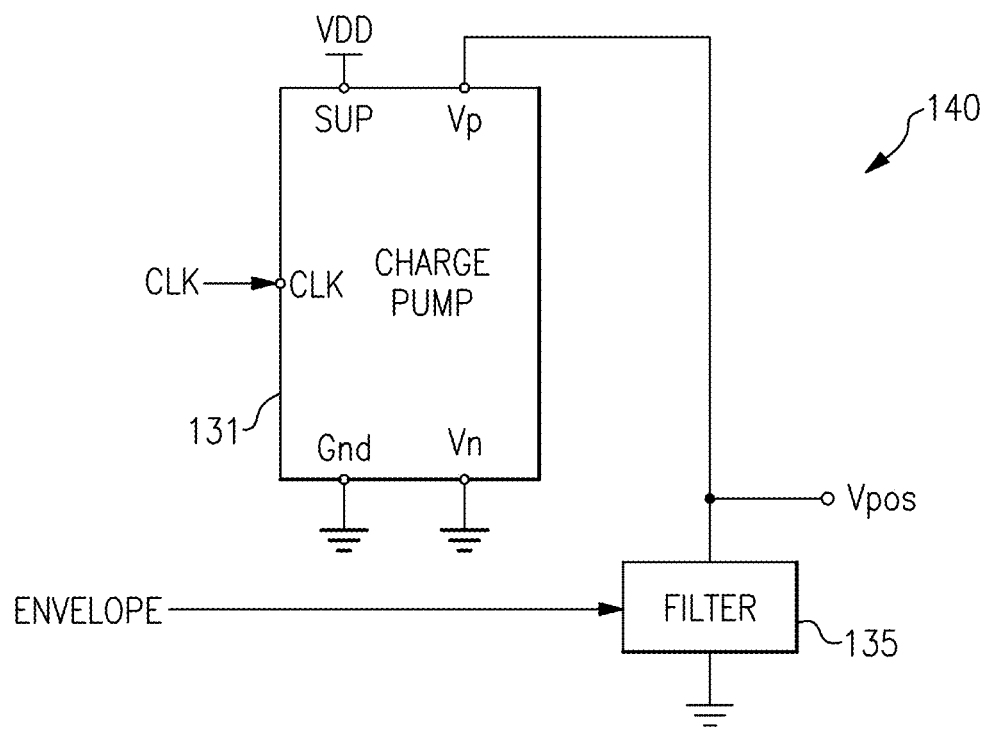
FIG. 5A is a schematic diagram of a positive charge pump according to one embodiment.

FIG. 5A is a schematic diagram of a positive charge pump 140 according to one embodiment. The positive charge pump 140 includes a charge pump stage 131 and a filter 135.

The positive charge pump 140 illustrates one embodiment of a positive charge pump suitable for generating a positive regulated voltage Vpos. However, the teachings herein are applicable to charge pump circuitry implemented in a wide variety of ways.

The charge pump stage 131 includes a clock terminal CLK that receives a clock signal CLK, a ground terminal Gnd that receives a ground voltage or ground, a supply voltage terminal SUP that receives a supply voltage VDD, a negative voltage terminal Vn that receives ground, and a positive voltage terminal Vp that outputs the positive regulated voltage Vpos.

In the illustrated embodiment, the envelope signal ENVELOPE is coupled to the positive regulated voltage Vpos by way of the filter 135. In certain implementations, the filter 135 is implemented a low pass filter such that low frequency components of the envelope signal ENVELOPE modulate the positive regulated voltage Vpos.

Figure 5B:
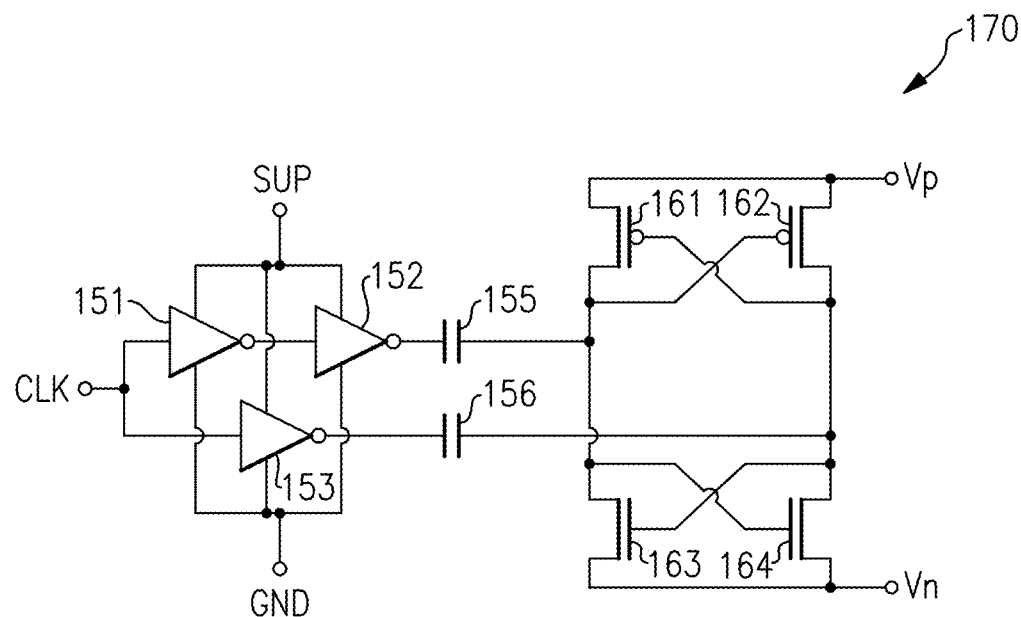
FIG. 5B is a schematic diagram of a charge pump stage according to one embodiment.

FIG. 5B is a schematic diagram of a charge pump stage 170 according to one embodiment. The charge pump stage 170 includes a first inverter 151, a second inverter 152, a third inverter 153, a first flying capacitor 155, a second flying capacitor 156, a first p-type metal oxide semiconductor (PMOS) transistor 161, a second PMOS transistor 162, a first n-type metal oxide semiconductor (NMOS) transistor 163, and a second NMOS transistor 164. The charge pump stage 170 includes a supply voltage terminal SUP, a ground voltage terminal GND, a clock terminal CLK, a positive voltage terminal Vp, and a negative voltage terminal Vn.

The charge pump stage 170 illustrates one embodiment of a charge pump stage. However, the teachings herein are applicable to charge pump circuitry implemented in a wide variety of ways.

Figure 6A:
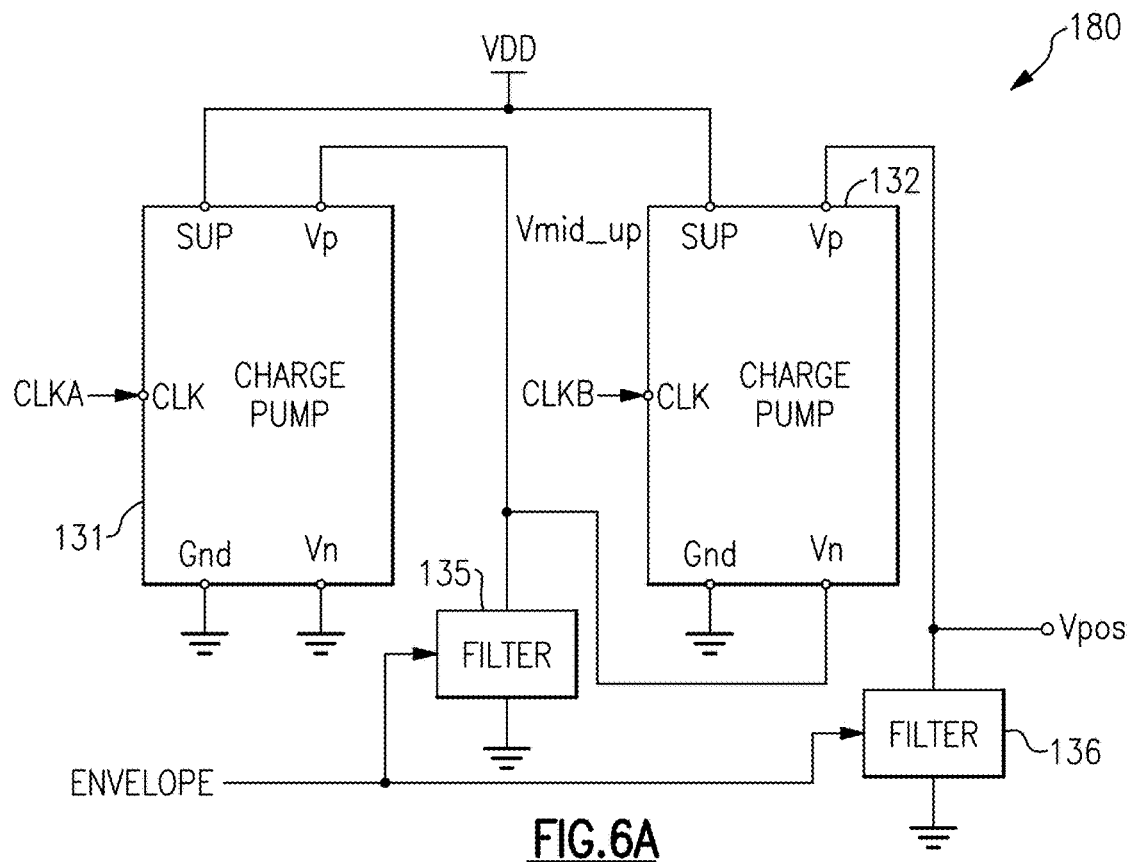
FIG. 6A is a schematic diagram of a positive charge pump according to another embodiment.

FIG. 6A is a schematic diagram of a positive charge pump 180 according to another embodiment. The positive charge pump 180 includes a first charge pump stage 131, a second charge pump stage 132, a first filter 135, and a second filter 136.

The positive charge pump 180 illustrates another embodiment of a positive charge pump suitable for generating a positive regulated voltage Vpos. However, the teachings herein are applicable to charge pump circuitry implemented in a wide variety of ways.

The positive charge pump 180 of FIG. 6A is similar to the positive charge pump 140 of FIG. 5A, except that the positive charge pump 180 is implemented with an additional charge pump stage and an additional filter. Including multiple charge pump stages aids in further raising the voltage level of the positive regulated voltage Vpos above the supply voltage VDD.

In the illustrated embodiment, the positive voltage terminal Vp of the first charge pump stage 131 outputs a stepped up voltage Vmid_up, which serves as an input to the negative voltage terminal Vn of the second charge pump stage 132. Additionally, the positive voltage terminal Vp of the second charge pump stage 132 generates the positive regulated voltage Vpos. Although an example with two charge pump stages is shown, a charge pump can include more or fewer stages.

As shown in FIG. 6A, the clock terminal CLK of the first charge pump stage 131 receives a first clock signal CLKA, while the clock terminal CLK of the second charge pump stage 132 receives a second clock signal CLKB. In certain implementations, the first clock signal CLKA and the second clock signal CLKB have about equal frequency but operate out of phase with respect to one another to reduce switching noise.

In the illustrated embodiment, the stepped up voltage Vmid_up is electrically connected to the first filter 135, and the positive regulated voltage Vpos is electrically connected to the second filter 136. Additionally, the envelope signal ENVELOPE is coupled to the stepped up voltage Vmid_up and the positive regulated voltage Vpos by way of the first filter 135 and the second filter 136, respectively.

Figure 6B:
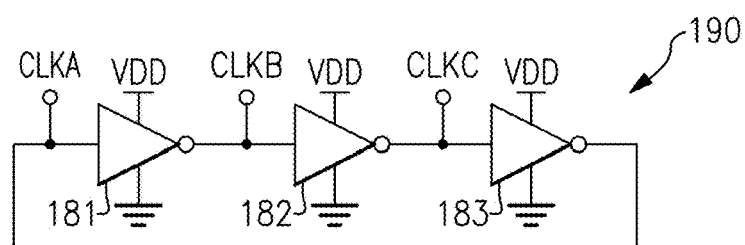
FIG. 6B is a schematic diagram of one example of a ring oscillator for generating clock signals for a charge pump.

FIG. 6B is a schematic diagram of one example of a ring oscillator 190 for generating clock signals for a charge pump. The ring oscillator 190 includes a first inverter 181, a second inverter 182, and a third inverter 183 that each receive power by way of a supply voltage VDD and ground.

The positive charge pump 190 illustrates one embodiment of a clock signal generator for a charge pump. However, the teachings herein are applicable to charge pump circuitry implemented in a wide variety of ways.

As shown in FIG. 6B, the first inverter 181 receives a first clock signal CLKA and outputs a second clock signal CLKB, the second inverter 182 receives the second clock signal CLKB and outputs a third clock signal CLKC, and the third inverter 183 receives the third clock signal CLKC and outputs the first clock signal CLKA.

Figure 6C:
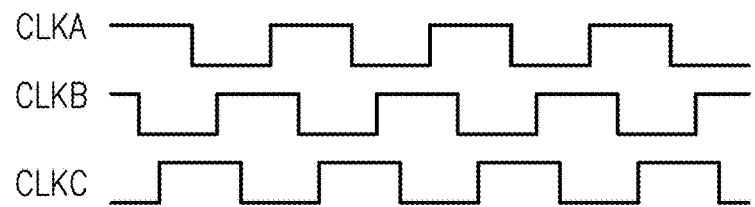
FIG. 6C is one example of a timing diagram of clock signals for the ring oscillator of FIG. 6B.

FIG. 6C is one example of a timing diagram of clock signals for the ring oscillator 190 of FIG. 6B. The timing diagram includes example voltage versus time waveforms for the first clock signal CLKA, the second clock signal CLKB, and the third clock signal CLKC of FIG. 6B.

Figure 7:
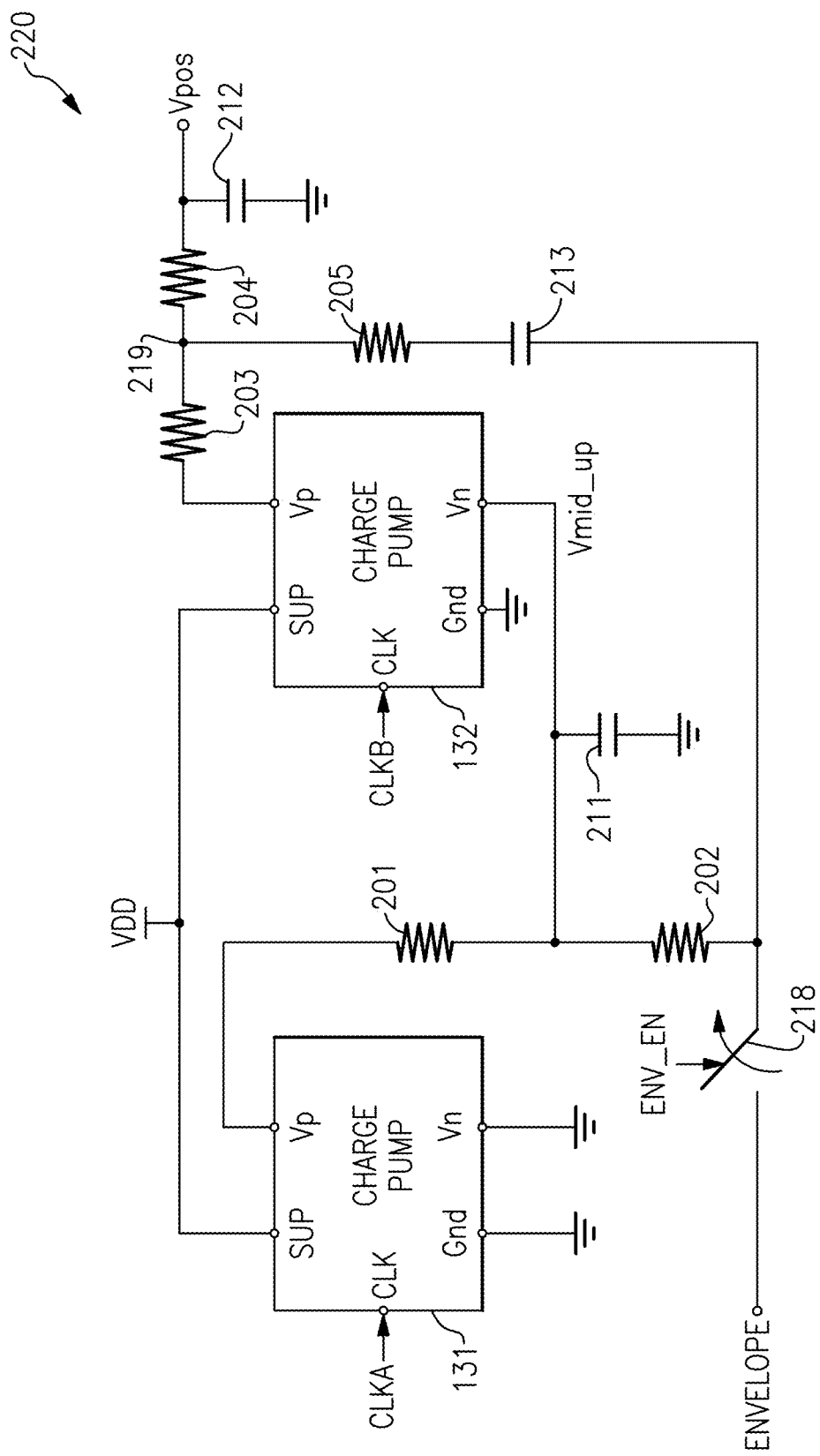
FIG. 7 is a schematic diagram of a positive charge pump according to another embodiment.

FIG. 7 is a schematic diagram of a positive charge pump 220 according to another embodiment. The positive charge pump 220 includes a first charge pump stage 131, a second charge pump stage 132, a first resistor 201, a second resistor 202, a third resistor 203, a fourth resistor 204, a fifth resistor 205, a first capacitor 211, a second capacitor 212, a third capacitor 213, and an envelope enable switch 218.

The positive charge pump 220 illustrates another embodiment of a positive charge pump suitable for generating a positive regulated voltage Vpos. However, the teachings herein are applicable to charge pump circuitry implemented in a wide variety of ways.

The positive charge pump 220 of FIG. 7 is similar to the positive charge pump 180 of FIG. 6A, except that the positive charge pump 220 illustrates a specific implementation of filter circuitry for filtering the stepped up voltage Vmid_up and the positive regulated voltage Vpos and for injecting the envelope signal ENV.

In the illustrated embodiment, the first resistor 201 is electrically connected between the positive voltage terminal Vp of the first charge pump stage 131 and the stepped up voltage Vmid_up, which serves as an input to the negative voltage terminal Vn of the second charge pump stage 132. Additionally, the second resistor 202 is electrically connected between the envelope enable switch 218 and the stepped up voltage Vmid_up, while the first capacitor 211 is electrically connected between the stepped up voltage Vmid_up and ground.

Thus, when an envelope enable signal ENV_EN turns on the envelope enable switch 218 to enable envelope control, the envelope signal ENVELOPE is injected into the stepped up voltage Vmid_up by way of the second resistor 202.

With continuing reference to FIG. 7, the third resistor 203 is electrically connected between a node 219 and the positive voltage terminal Vp of the second charge pump stage 132, while the fourth resistor 204 is electrically connected between the node 219 and the positive regulated voltage Vpos. Additionally, the second capacitor 212 is electrically connected between the positive regulated voltage Vpos and ground, while the fifth resistor 205 and the third capacitor 213 are electrically connected in series between the node 219 and the envelope enable switch 218.

Thus, when the envelope enable switch 218 is turned on, the envelope signal ENVELOPE is injected into the positive regulated voltage Vpos by way of the third capacitor 213, the fifth resistor 205, and the fourth resistor 204.

Including the third capacitor 213 aids in providing DC blocking, thereby preventing a flow of DC current between the positive regulated voltage Vpos and the stepped up voltage Vmid_up.

Figure 8:
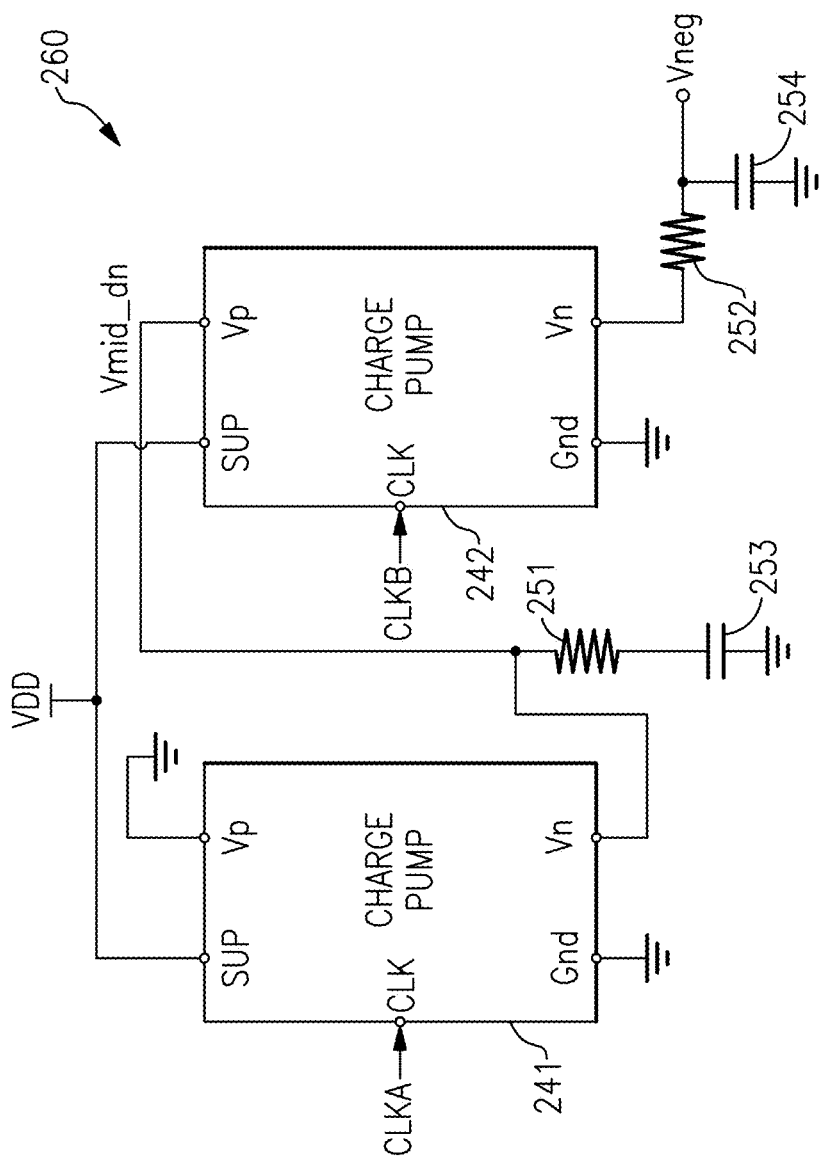
FIG. 8 is a schematic diagram of a negative charge pump according to one embodiment.

FIG. 8 is a schematic diagram of a negative charge pump 260 according to one embodiment. The negative charge pump 260 includes a first charge pump stage 241, a second charge pump stage 242, a first filter resistor 251, a second filter resistor 252, a first filter capacitor 253, and a second filter capacitor 254.

The negative charge pump 260 illustrates one embodiment of a negative charge pump suitable for generating a negative regulated voltage Vneg. However, the teachings herein are applicable to charge pump circuitry implemented in a wide variety of ways.

In the illustrated embodiment, the positive voltage terminal Vp of the first charge pump stage 241 is electrically connected to ground, while the negative voltage terminal Vn of the first charge pump stage 241 generates a stepped down voltage Vmid_dn, which serves as an input to the positive voltage terminal Vp of the second charge pump stage 142. Although an example with two charge pump stages is shown, a charge pump can include more or fewer stages.

As shown in FIG. 8, the clock terminal CLK of the first charge pump stage 241 receives a first clock signal CLKA, while the clock terminal CLK of the second charge pump stage 242 receives a second clock signal CLKB. In certain implementations, the first clock signal CLKA and the second clock signal CLKB have about equal frequency but operate out of phase with respect to one another.

In the illustrated embodiment, the first filter resistor 251 and the first filter capacitor 253 are electrically connected in series between the stepped down voltage Vmid_dn and ground. Additionally, the second filter resistor 252 is electrically connected between the negative voltage terminal Vn of the second charge pump stage 142 and the negative regulated voltage Vneg, and the second filter capacitor 254 is electrically connected between the negative regulated voltage Vneg and ground.

Figure 9:
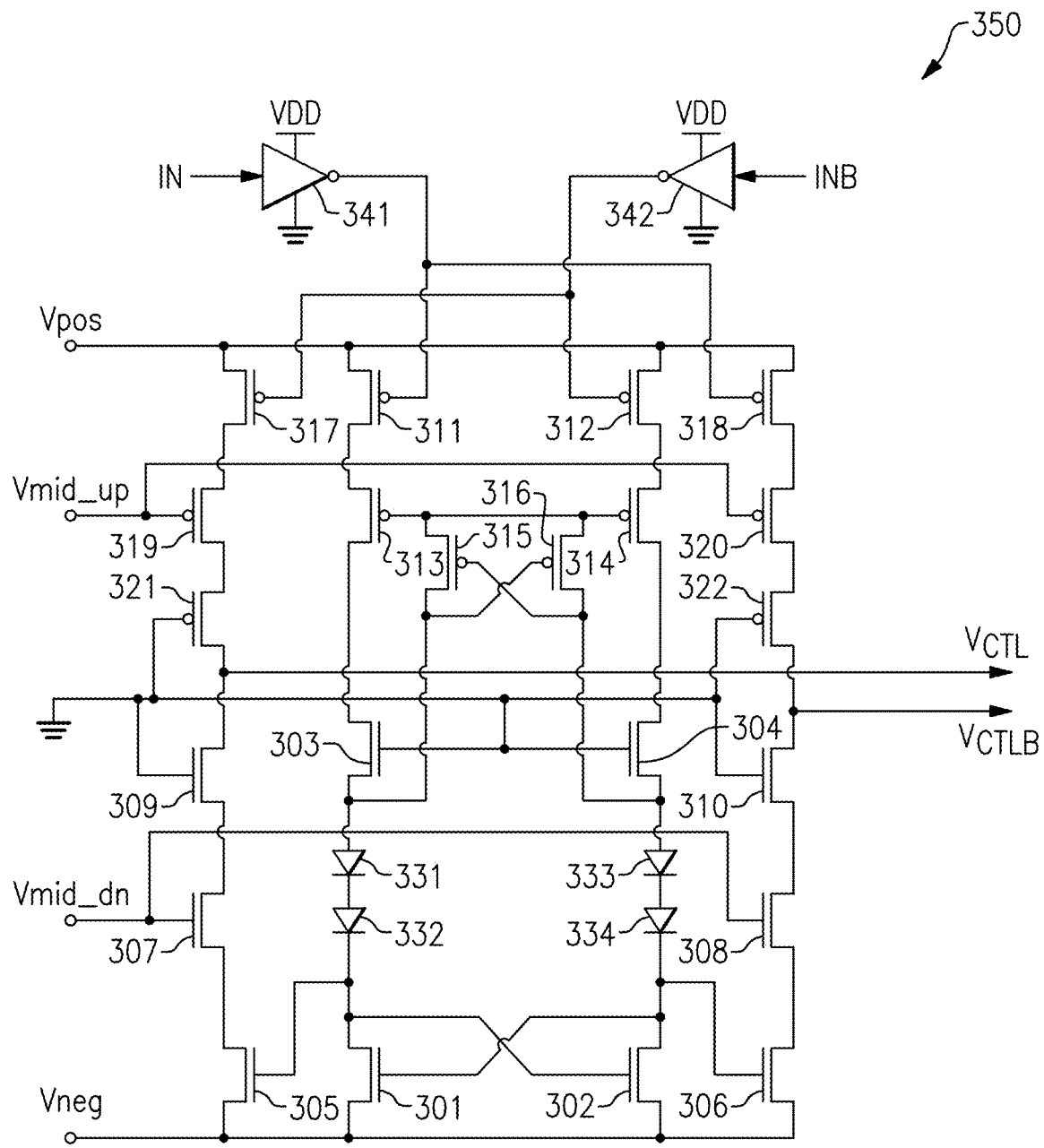
FIG. 9 is a schematic diagram of a level shifter according to one embodiment.

FIG. 9 is a schematic diagram of a level shifter 350 according to one embodiment. The level shifter 350 includes first to tenth NFETs 301-310, respectively, first to twelfth PFETs 311-322, respectively, first to fourth diodes 331-334, respectively, a first inverter 341, and a second inverter 342. The first inverter 341 and the second inverter 342 are powered by a supply voltage VDD and ground. Additionally, the level shifter 350 receives a positive regulated voltage Vpos, a negative regulated voltage Vneg, a stepped up voltage Vmid_up, and a stepped down voltage Vmid_dn from charge pump circuitry. Furthermore, the level shifter 350 receives an input control signal IN and an inverted input control signal INB, and generates a switch control voltage $V_{CTL}$ and an inverted switch control voltage $V_{CTLB}$.

The level shifter 350 illustrates one embodiment of the level shifter 102 of FIG. 4. However, the teachings herein are applicable to level shifters implemented in other ways.

Figure 10:
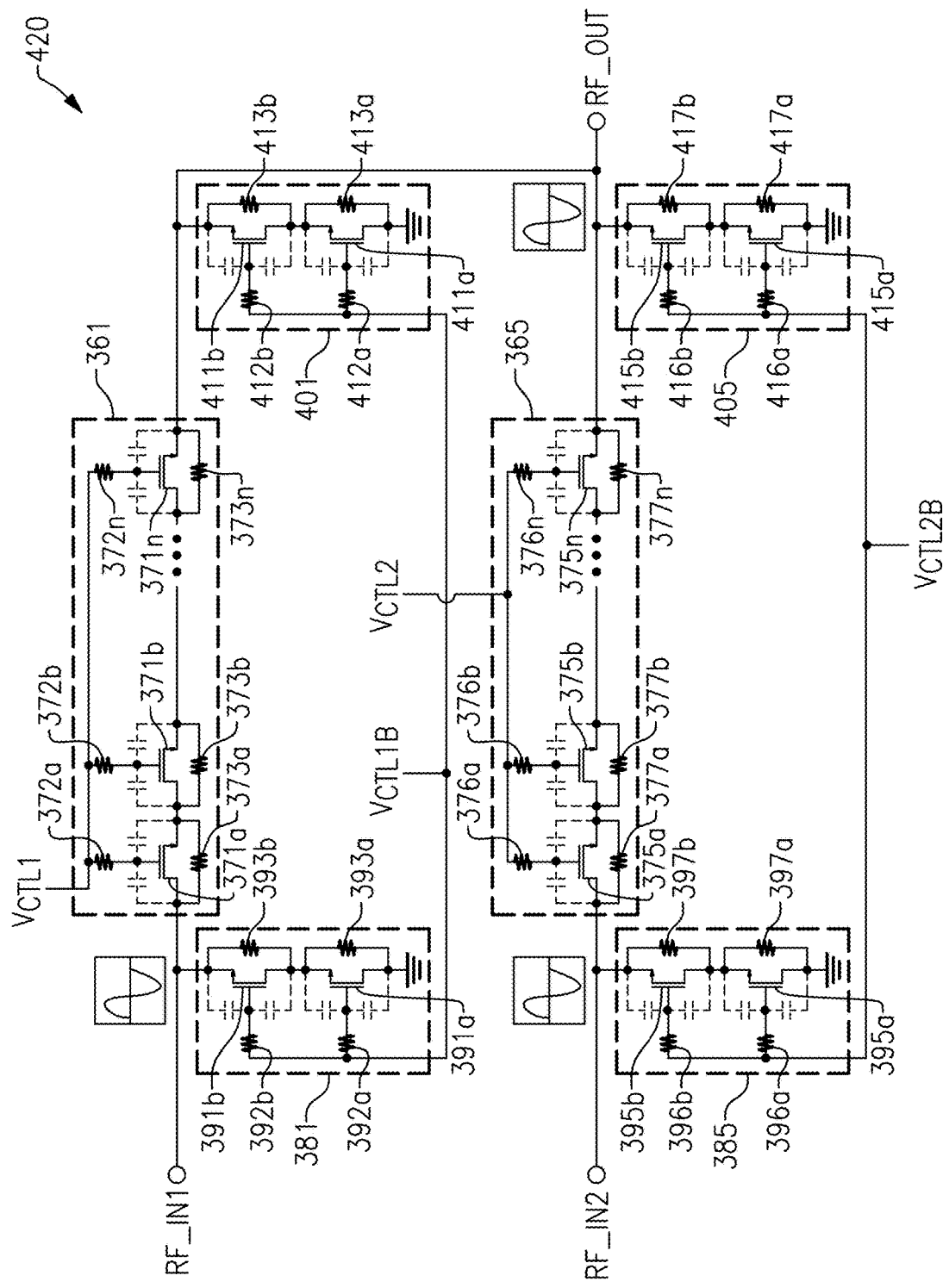
FIG. 10 is a schematic diagram of an RF switch network according to another embodiment.

FIG. 10 is a schematic diagram of an RF switch network 420 according to another embodiment. The RF switch network 420 includes a first series transistor switch 361, a second series transistor switch 365, a first input shunt transistor switch 381, a second input shunt transistor switch 385, a first output shunt transistor switch 401, and a second output shunt transistor switch 405.

The RF switch network 420 of FIG. 10 illustrates another embodiment of an RF switch network suitable for use in an RF switch system, such as the RF switch system 120 of FIG. 4. However other implementations are possible, including, but not limited, RF switch networks including more or fewer series transistor switches and/or more or fewer shunt transistor switches.

In the illustrated embodiment, the first series transistor switch 361 is electrically connected between a first RF input terminal RF_IN1 and an RF output terminal RF_OUT, and the second series transistor switch 365 is electrically connected between a second RF input terminal RF_IN2 and the RF output terminal RF_OUT. Additionally, the first input shunt transistor switch 381 is electrically connected between the first RF input terminal RF_IN1 and ground, and the second input shunt transistor 385 is electrically between the second RF input terminal RF_IN2 and ground. Furthermore, the first output shunt transistor switch 401 is electrically connected between the RF output terminal RF_OUT and ground, and the second output shunt transistor switch 405 is electrically connected between the RF output terminal RF_OUT and ground.

As shown in FIG. 10, a first switch control voltage $V_{CTL1}$ controls the first series transistor switch 361, and a first inverted switch control voltage $V_{CTLB1}$ controls the first input shunt transistor switch 381 and the first output shunt transistor switch 401. Furthermore, a second switch control voltage $V_{CTL2}$ controls the second series transistor switch 365, and a second inverted switch control voltage $V_{CTLB2}$ controls the second input shunt transistor switch 385 and the second output shunt transistor switch 405. In certain implementations, a first level shifter generates the first switch control voltage $V_{CTL1}$ and the first inverted switch control voltage $V_{CTLB1}$, while a second level shifter generates the second switch control voltage $V_{CTL2}$ and the second inverted switch control voltage $V_{CTLB2}$.

The depicted transistor switches each include a number of transistors in series to achieve a desired power handling capability, with the transistors biased used corresponding gate resistors and channel resistors.

For example, the first series transistor switch 361 includes NFETs 371a, 371b, . . . 371n, gate resistors 372a, 372b, . . . 372n, and channel resistors 373a, 373b, . . . 373n. Additionally, the second series transistor switch 365 includes NFETs 375a, 375b, . . . 375n, gate resistors 376a, 376b, . . . 376n, and channel resistors 377a, 377b, . . . 377n. Furthermore, the first input shunt transistor switch 381 includes NFETs 391a, 391b, gate resistors 392a, 392b, and channel resistors 393a, 393b. Additionally, the second input shunt transistor switch 385 includes NFETs 395a, 395b, gate resistors 396a, 396b, and channel resistors 397a, 397b. Furthermore, the first output shunt transistor switch 401 includes NFETs 411a, 411b, gate resistors 412a, 412b, and channel resistors 413a, 413b. Additionally, the second output shunt transistor switch 405 includes NFETs 415a, 415b, gate resistors 416a, 416b, and channel resistors 417a, 417b.

Examples of Envelope Tracking Calibration

Envelope tracking (ET) is a technique that can be used to increase power added efficiency (PAE) of a power amplifier by efficiently controlling a voltage level of a power amplifier supply voltage in relation to an envelope of a radio frequency (RF) signal amplified by the power amplifier. Thus, when the envelope of the RF signal increases, the voltage supplied to the power amplifier can be increased. Likewise, when the envelope of the RF signal decreases, the voltage supplied to the power amplifier can be decreased to reduce power consumption.

Schemes for aligning an envelope signal to a circuit that uses the envelope signal are provided. In one example, the circuit correspond to an envelope tracker that controls the supply voltage of a power amplifier in relation to the envelope signal. In a second example, the circuit corresponds to a charge pump that controls a regulated voltage (for instance, for turning on an RF switch) in relation to the envelope signal.

In certain embodiments, calibration is performed by providing an envelope signal with a peak along an envelope path, and by providing an RF signal with a first peak and a second peak to a power amplifier along an RF signal path. Additionally, an output of the power amplifier is observed to generate an observation signal using an observation receiver. The observation signal includes a first peak and a second peak corresponding to the first peak and the second peak of the RF signal, and a delay between the envelope signal and the RF signal is controlled based on relative size of the peaks of the observation signal to one another.

In certain implementations, the delay is controlled such that the peaks in the observation signal are of about equal size to one another. Additionally, the delay can be incremented or decremented until alignment is achieved to a desired accuracy. Thus, an accurate and a flexible mechanism is provided for aligning an envelope signal to an RF signal.

By calibrating envelope tracker delay in accordance with the teachings herein, calibration can be achieved even when a duplexer and/or other front end component(s) have a narrow band frequency response. In contrast, certain conventional envelope calibration schemes can suffer from inaccuracies and/or inability to calibrate when narrow band components are present along a path from the output of the power amplifier to an observation receiver.

In certain implementations, a controllable delay circuit is programmed with a delay generated based on the calibration. For example, a controllable capacitor and/or other controllable delay circuit can have a setting selected based on the calibration. The setting can be controlled based on analog and/or digital signals. For instance, a front end system can include a memory and a controllable delay circuit that is programmed based on calibration data stored in the memory. In one example, the memory is a non-volatile memory programmed with data generated by a calibration sequence after manufacture or deployment in a communication system, such as a mobile device. In a second example, the memory is volatile and is programmed with the calibration data over a serial interface, for instance, after power up.

The calibration can also be used to control a delay of multiple components that operate based on the envelope signal. For example, a front end system can include an envelope tracker that controls a supply voltage of the power amplifier, and a charge pump that controls a regulated voltage for turning on an RF switch based on the envelope signal. Additionally, calibration can be used to control a relatively delay between the envelope signal being provided to the envelope tracker and envelope signal being provided to the charge pump.

Figure 11:
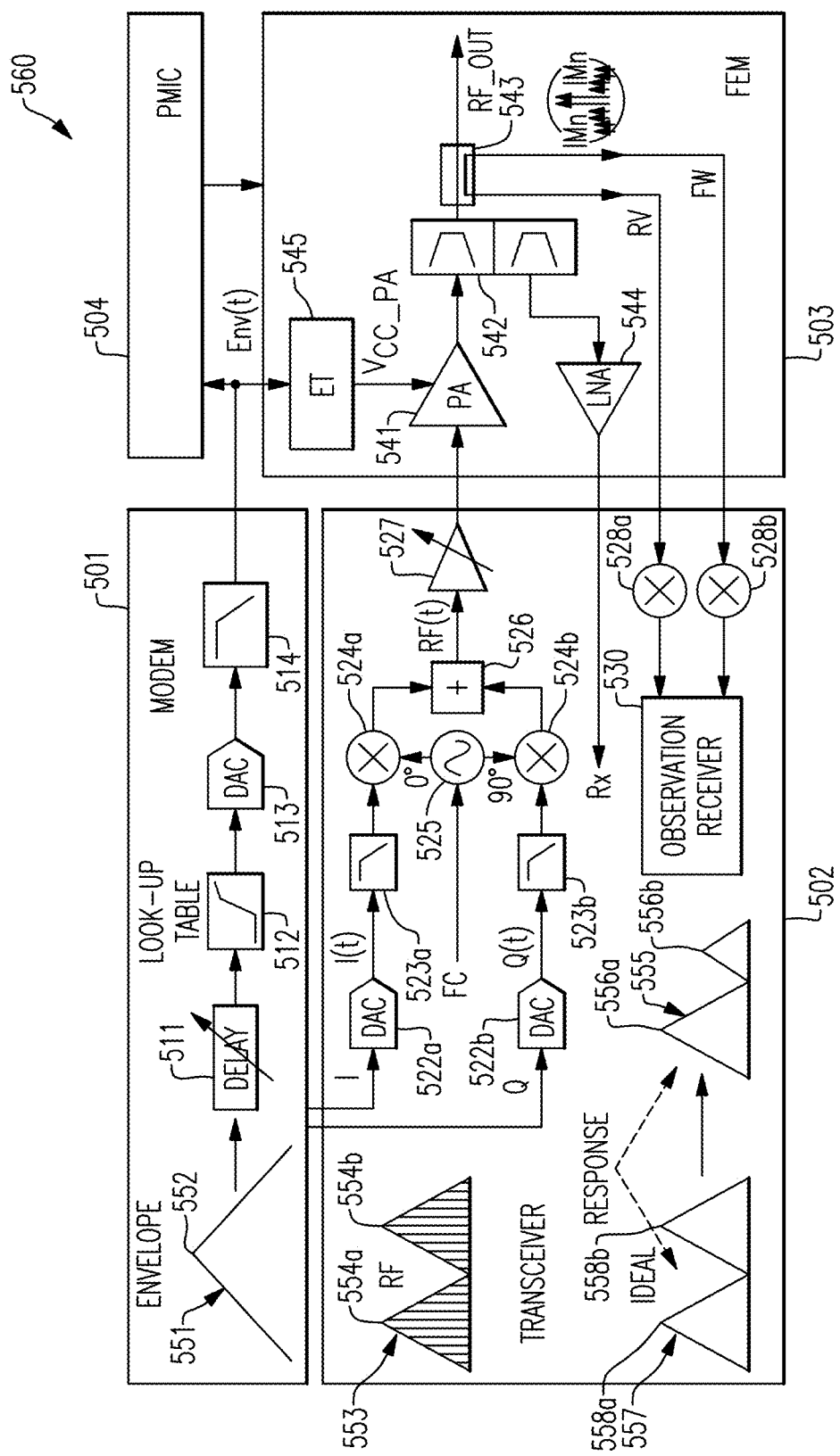
FIG. 11 is a schematic diagram of one embodiment of a calibration scheme for a communication system operating with envelope tracking.

FIG. 11 is a schematic diagram of one embodiment of a calibration scheme for a communication system 560 operating with envelope tracking. The communication system 560 includes a baseband modem 501, a transceiver 502, a front end module 503, and a power management integrated circuit (PMIC) 504.

In the illustrated embodiment, the baseband modem 501 includes a controllable delay circuit 511, a look-up table 512, an envelope digital-to-analog converter (DAC) 513, and an envelope filter 514. The baseband modem 501 operates to generate an in-phase (I) signal and a quadrature-phase (Q) signal along with an envelope signal Env(t) indicating the envelope of the RF signal represented by the I signal and the Q signal. The controllable delay circuit 511 controls a delay of the envelope signal Env(t).

With continuing reference to FIG. 11, the transceiver 502 includes an I-path DAC 522a, a Q-path DAC 522b, an I-path baseband filter 523a, a Q-path baseband filter 523b, an I-path mixer 524b, a Q-path mixer 524b, a local oscillator 525, a combiner 526, a controllable driver 527, a first observation mixer 528a, a second observation mixer 528b, and an observation receiver 530. The transceiver 502 processes the I signal and the Q signal to generated an RF signal RF(t) that is amplified by the controllable driver 527 and thereafter provided to the front end module 503.

The front end module 503 includes a power amplifier 541, a duplexer 542, a directional coupler 543, a low noise amplifier (LNA) 544, and an envelope tracker 545. The power amplifier 541 amplifies the RF signal from the transceiver 502 and provides an RF output signal RF_OUT by way of the duplexer 542 and directional coupler 543. The RF output signal RF_OUT is provided to an antenna (now shown in FIG. 11) for transmission.

The power amplifier supply voltage $V_{CC\_PA}$ of the power amplifier 541 is controlled by the envelope tracker 545 based on the envelope signal Env(t) from the baseband modem 501. The envelope signal Env(t) is also provide to the PMIC 504, which processes the envelope signal Env(t) to generate one or more regulated voltage for the front end module 503.

With continuing reference to FIG. 11, the directional coupler 543 senses a reverse wave (RV) and a forward wave (FW), which are downconverted by the first observation mixer 528a and the second observation mixer 528b, respectively, and subsequently processed by the observation receiver 530.

The delay of the controllable delay circuit 511 controls a relative delay or time difference between the envelope signal Env(t) and the RF signal RF(t). Thus, the delay of the controllable delay circuit 511 can be set to a value for aligning the RF signal and the power amplifier supply voltage $V_{CC\_PA}$ at the power amplifier 541.

The delay of a controllable delay circuit (for instance, the controllable delay circuit 511) can be calibrated in accordance with the teachings herein to align an RF signal to an envelope controlled signal. For instance, an envelope controlled supply voltage to a power amplifier can be aligned to an RF input signal to the power amplifier.

In the illustrated embodiment, the baseband modem 501 generates an envelope signal 551 by way of an envelope path to the envelope tracker 545. The envelope signal 551 includes a peak 552 and has a relatively low bandwidth. In one example, during calibration, the envelope signal 551 has a bandwidth of less than 1 MHz. Additionally, the baseband modem provides an RF signal 553 having a first peak 554a and a second peak 554b to the amplifier 541 by way of an RF signal path.

With continuing reference to FIG. 11, the observation receiver 530 captures an observation signal 555 from an output of the power amplifier 541 by way of an observation path. The observation signal 555 includes a first peak 556a and a second peak 556b.

In certain implementations, the delay of the controllable delay circuit 511 is adjusted until the first peak 556a and the second peak 556b of the observation signal 555 are substantially equal, corresponding to an ideal signal 557 having a first peak 558a and a second peak 558b that are about equal to one another.

Figure 12A:
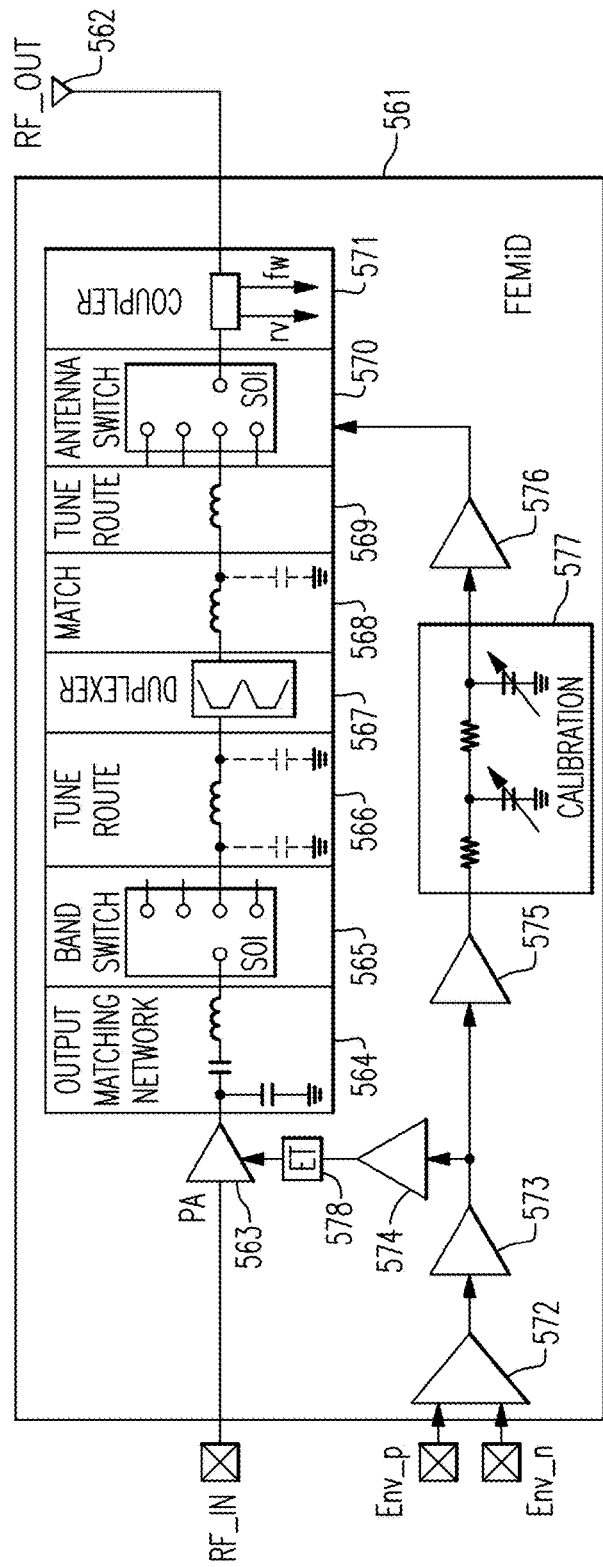
FIG. 12A is a schematic diagram of one embodiment of a front end module coupled to an antenna.

FIG. 12A is a schematic diagram of one embodiment of a front end module 561 coupled to an antenna 562. The front end module 561 includes a power amplifier 563, a power amplifier output matching network 564, a band switch 565, a first tuning route 566, a duplexer 567, a matching network 568, a second tuning route 569, an antenna switch 570, a directional coupler 571, a differential envelope amplifier 572, a first envelope buffer 573, a second envelope buffer 574, a third envelope buffer 575, a fourth envelope buffer 576, a delay calibration circuit 577, and an envelope tracker 578.

In the illustrated embodiment, an envelope signal (represented differentially as a difference between a non-inverted envelope signal Env_p and an inverted envelope signal Env_n) is used to both control a supply voltage $V_{CC\_PA}$ of the power amplifier 563 and a regulated voltage of the antenna switch 570.

When the envelope signal is aligned to the envelope tracker 578, the envelope signal may not be aligned to the antenna switch 570. By including the delay calibration circuit 577, a desired delay between the envelope signal arriving to the envelope tracker 578 and the envelope signal arriving to the antenna switch 570 can be controlled.

Figure 12B:
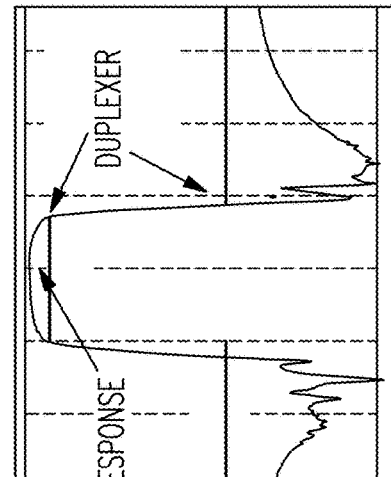
FIG. 12B is a plot of one example of an in-band frequency response for a duplexer of the front end module of FIG. 12A.

FIG. 12B is a plot of one example of an in-band frequency response for the duplexer 567 of the front end module 561 of FIG. 12A. As shown in FIG. 12B, the duplexer 567 can have a narrow band response and/or group delay effects that can complicate calibration for alignment between an RF signal and an envelope signal.

By calibrating envelope tracker delay in accordance with the teachings herein, calibration can be achieved even when a duplexer and/or other front end component(s) have a narrow band response. Moreover, such a filter (such as an acoustic filter and/or a filter section of a duplexer) can be calibrated in accordance with the calibration schemes herein by sensing the signal before and after the filter and applying calibration coefficients into a transceiver (for instance, digital pre-distortion coefficients). In contrast, certain conventional envelope calibration schemes can suffer from inaccuracies and/or inability to calibrate when narrow band components are present along a path from the output of the power amplifier to an observation receiver.

Figure 13:
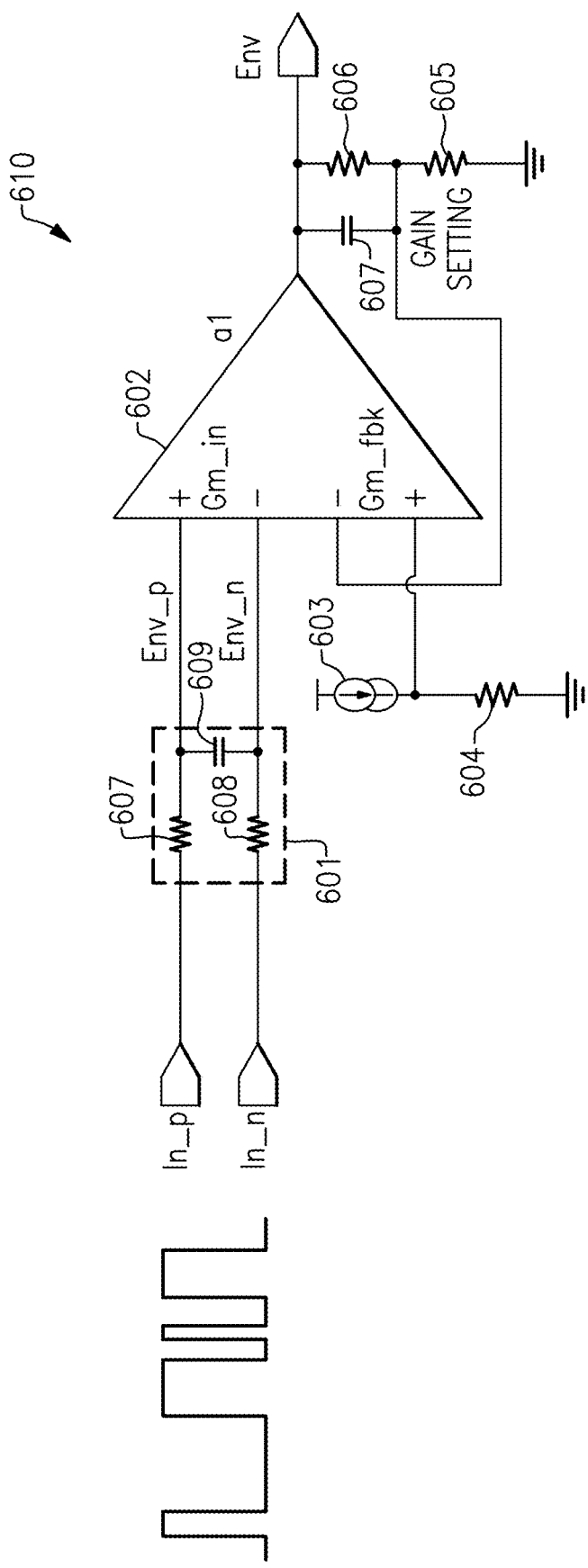
FIG. 13 is a schematic diagram of one embodiment of an envelope signal interface.

FIG. 13 is a schematic diagram of one embodiment of an envelope signal interface 610. The envelope signal interface 610 includes a differential input envelope filter 601, a dual input differential amplifier 602, a current source 603, a load resistor 604, a first feedback resistor 605, a second feedback resistor 606, a feedback capacitor 607. Additionally, the differential input envelope filter 601 includes a first input resistor 607, a second input resistor 608, and an input capacitor 609.

The differential input envelope filter 601 filters a differential input signal (In_p, In_n) to generate a differential envelop signal (Env_p, Env_n) that is provided to a first differential input of the dual input differential amplifier 602. The dual input differential amplifier 602 further includes an output that generates an envelope signal ENV, and a feedback loop from the output to a second differential input. The feedback operates to compensate for an error in a common voltage of the differential envelope signal. In certain implementations the current source 603 is controllable (for instance, variable and/or programmable) to control a common mode setting for providing common mode feedback.

The differential input envelope filter 601 can advantageously receive a differential envelope signal in a sigma delta format. Thus, the differential input signal (In_p, In_n) can carry a sequence of pulses. Additionally, the resulting envelope signal ENV can be filtered to recover the envelope in an analog format, or processed to generate a digital representation of the envelope.

Accordingly, the envelope signal interface 610 provides flexibility in generating an envelope signal in analog or digital format as desired.

Figure 14:
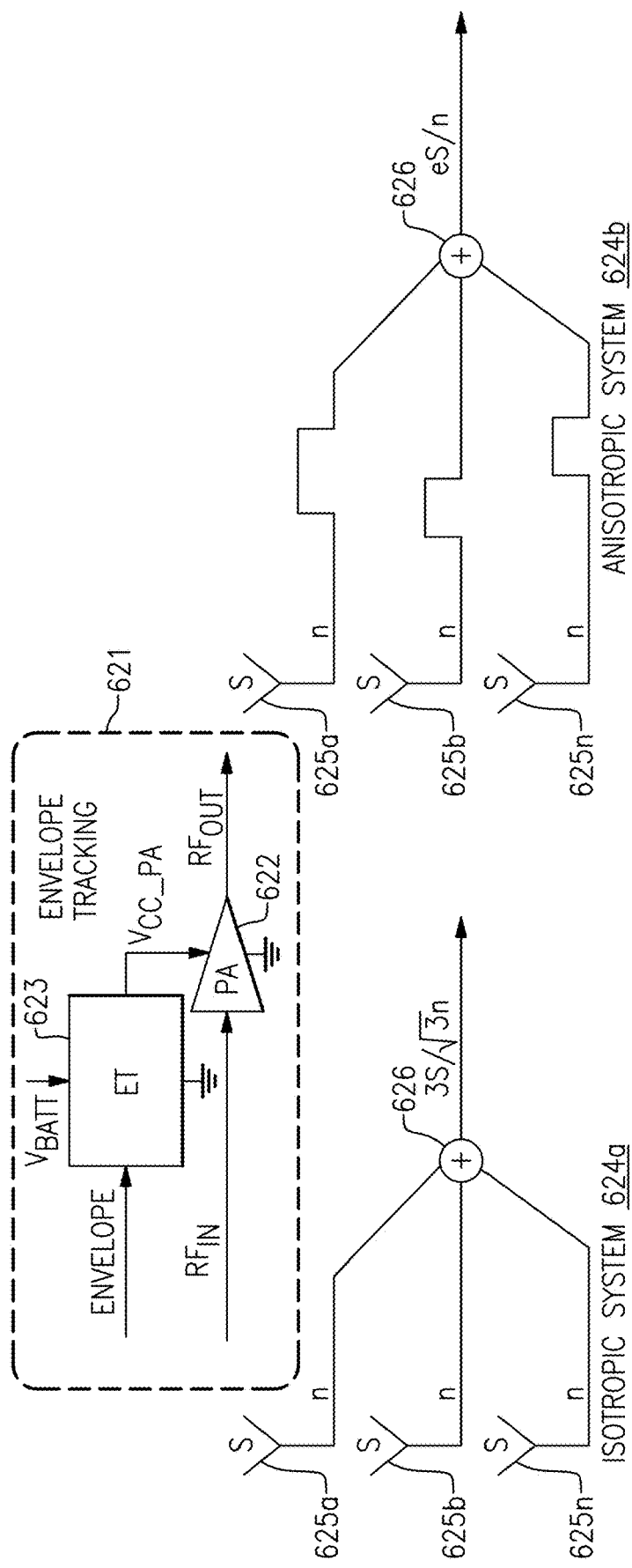
FIG. 14 is an annotated diagram of an envelope tracking system in relation to Shannon's theorem.

FIG. 14 is an annotated diagram of an envelope tracking system 621 in relation to Shannon's theorem. The envelope tracking system 621 includes a power amplifier 622 that amplifies an RF input signal $RF_{IN}$ to generates an RF output signal $RF_{OUT}$, and an envelope tracker 623 powered by a battery voltage $V_{BATT}$ and that controls a supply voltage $V_{CC\_PA}$ of the power amplifier 622 in relation to an envelope of the RF input signal $RF_{IN}$.

As shown in FIG. 14, annotations related to Shannon's theorem have been provided. In particular, an isotropic system 624a with antennas 625a, 625b, . . . 625n and a combiner 626 is shown. Each of the antennas 625a, 625b, . . . 625n receives signal S, and the combiner 626 output $3S(\sqrt{3}n)$. Additionally, an anisotropic system 624b with antennas 625a, 625b, . . . 625n and a combiner 626 is also shown. Each of the antennas 625a, 625b, . . . 625n receives signal S, and the combiner 626 of the anisotropic system 624b outputs eS/n.

ET techniques can be seen as an extension of the Shannon theory for anisotropic systems, where factor e represents the increase of the output signal when the envelope signal is aligned with the RF signal going into the power amplifier or other RF system.

The capacity of a wireless system as determined by Shannon formula is given in Equation 4 below.

$$C = B_w \sum_{k=1}^{k} \log_2\left(1 + \frac{en * S_k}{N_x + I_k}\right) \qquad \text{Equation 4}$$

To achieve higher capacity following Equation 4, the channel bandwidth can be increased, the spatial multiplexing level k can be raised through MIMO, the noise Nx can be decreased through improved receive sensitivity, and/or in-band interference on link k can be reduced (for instance, in multiple uplink transmit such as carrier aggregation and MIMO). Moreover, the channel capacity C can be increased through use of envelope tracking.

Examples of Radio Frequency Electronics with Envelope Tracking

Envelope tracking circuitry can be included in a wide variety of radio frequency (RF) communication systems. Examples of such RF communication systems include, but are not limited to, mobile phones, tablets, base stations, network access points, customer-premises equipment (CPE), laptops, and wearable electronics. In certain implementations, envelope tracking circuitry can be included on a semiconductor die of a module, which in turn can be attached to a circuit board of an RF communication system.

Although various examples of RF electronics with envelope tracking are provided, the teachings herein are applicable to RF electronics implemented in a wide variety of ways. Accordingly, other implementations are possible.

Figure 15:
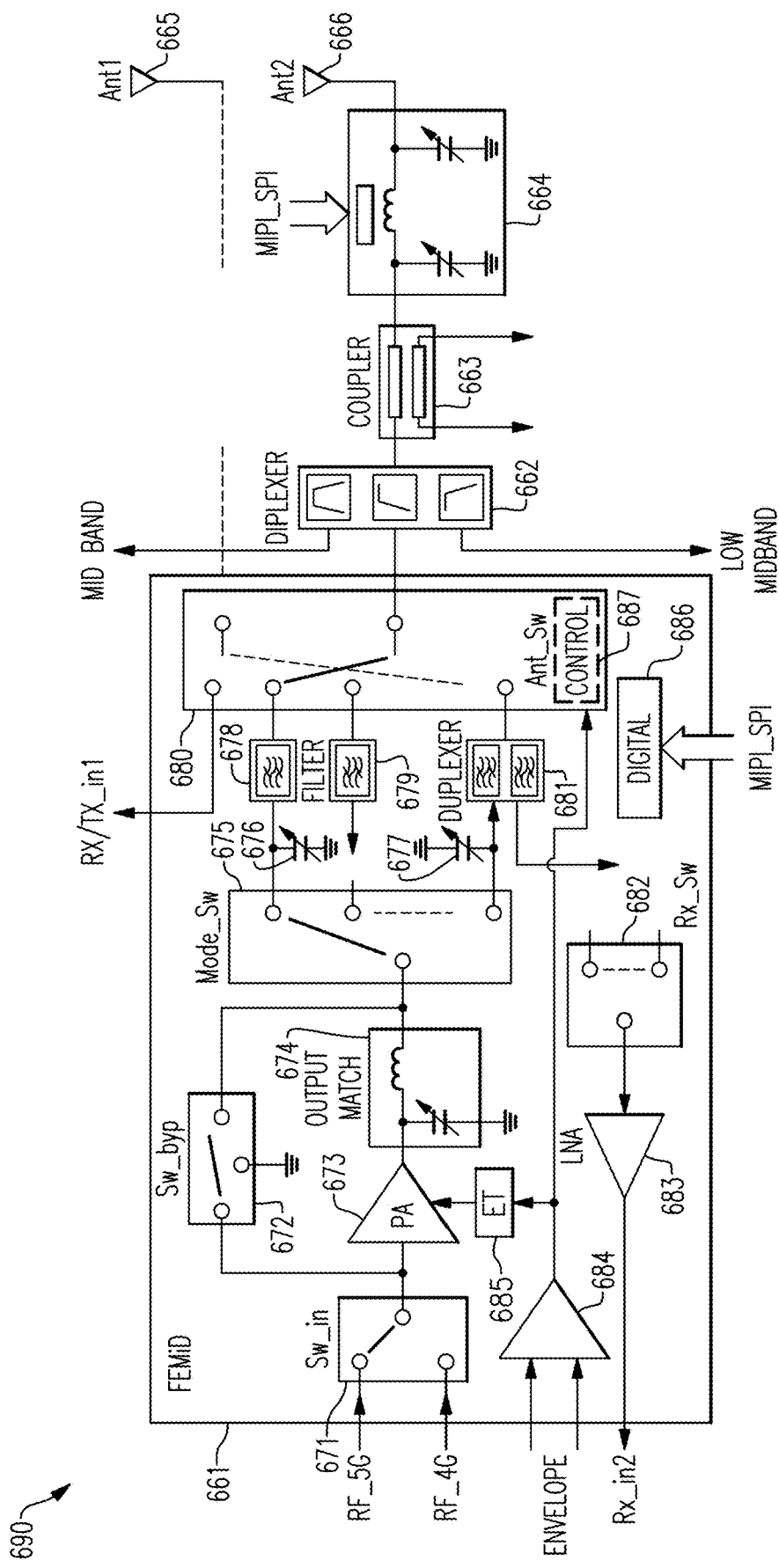
FIG. 15 is a schematic diagram of a front end system according to another embodiment.

FIG. 15 is a schematic diagram of a front end system 690 according to another embodiment. The front end system 690 includes a front end module 661, a diplexer 662, a directional coupler 663, an antenna tuning circuit 664, a first antenna 665, and a second antenna 666.

In the illustrated embodiment, the front end system 690 includes an input switch 671, a bypass switch 672, a power amplifier 673, an output matching circuit 674, a mode switch 675, a first tunable capacitor 676, a second tunable capacitor 677, a TDD transmit filter 678, a TDD receive filter 679, an antenna switch 680, an FDD duplexer 681, a receive switch 682, a low noise amplifier 683, an envelope amplifier 684, envelope tracker 685, and a digital interface circuit 686. In this example, the digital interface circuit 686 is connected to a Mobile Industry Processor Interface (MIPI) serial peripheral interface (SPI) bus, which is also connected to the antenna tuning circuit 664.

As shown in FIG. 15, the antenna switch 680 includes a switch control circuit 687 that receives an envelope signal from the envelope amplifier 684. In certain implementations, the switch control circuit 687 includes charge pump circuitry that generates a regulated voltage that is controlled by the envelope signal, and the regulated voltage is used to turn on one or more transistors used as switch elements in the antenna switch 680. In the illustrated embodiment, the envelope signal is also provided to the envelope tracker 685.

Figure 16:
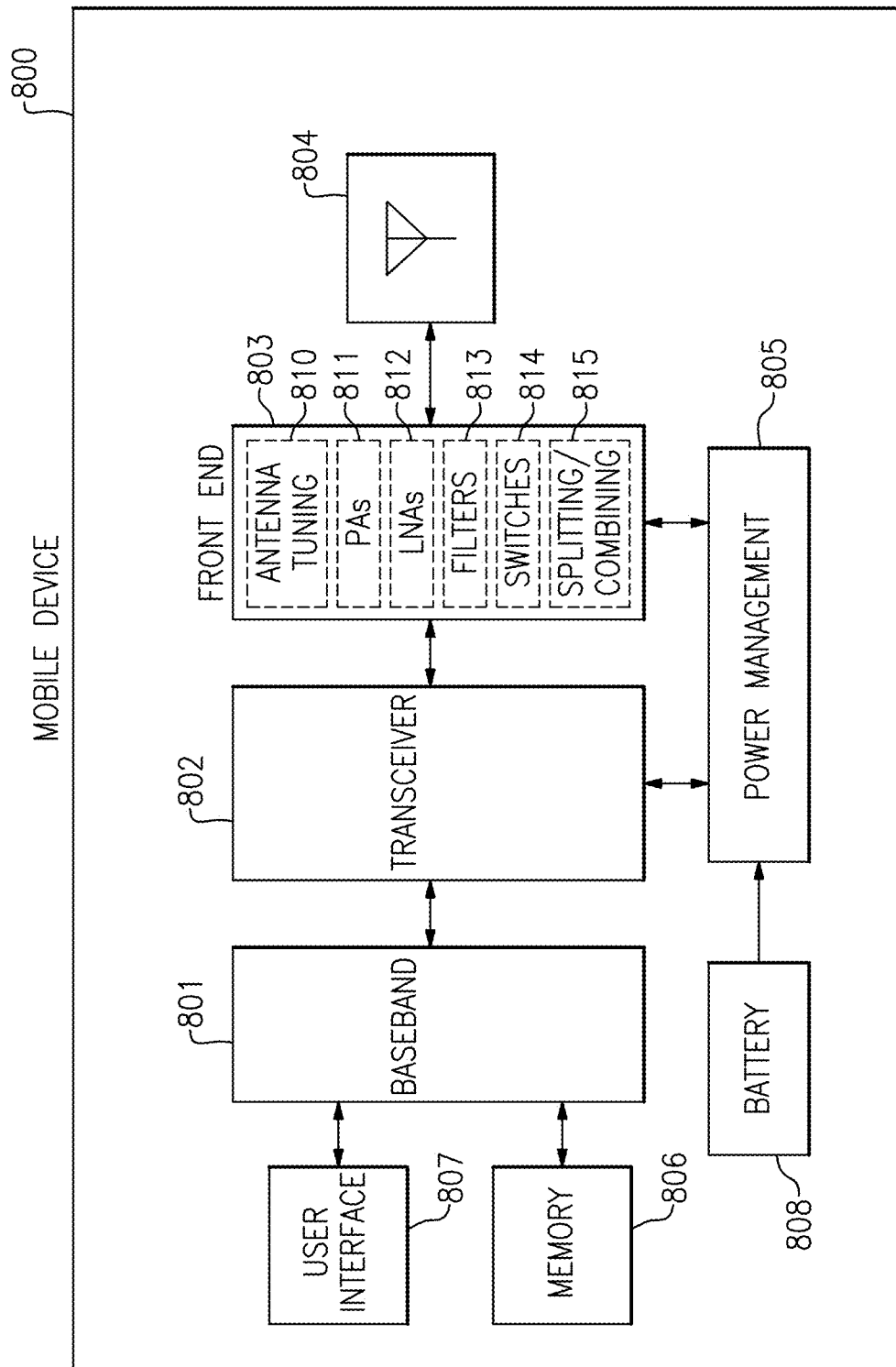
FIG. 16 is a schematic diagram of one embodiment of a mobile device.

FIG. 16 is a schematic diagram of one embodiment of a mobile device 800. The mobile device 800 includes a baseband system 801, a transceiver 802, a front end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 16 as the transceiver 802. In one example, separate components (for instance, separate circuits or dies) can be provided for handling certain types of RF signals.

The front end system 803 aids is conditioning signals transmitted to and/or received from the antennas 804. In the illustrated embodiment, the front end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 16, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 16, the power management system 805 receives a battery voltage from the battery 808. The battery 808 can be any suitable battery for use in the mobile device 800, including, for example, a lithium-ion battery.

Figure 17:
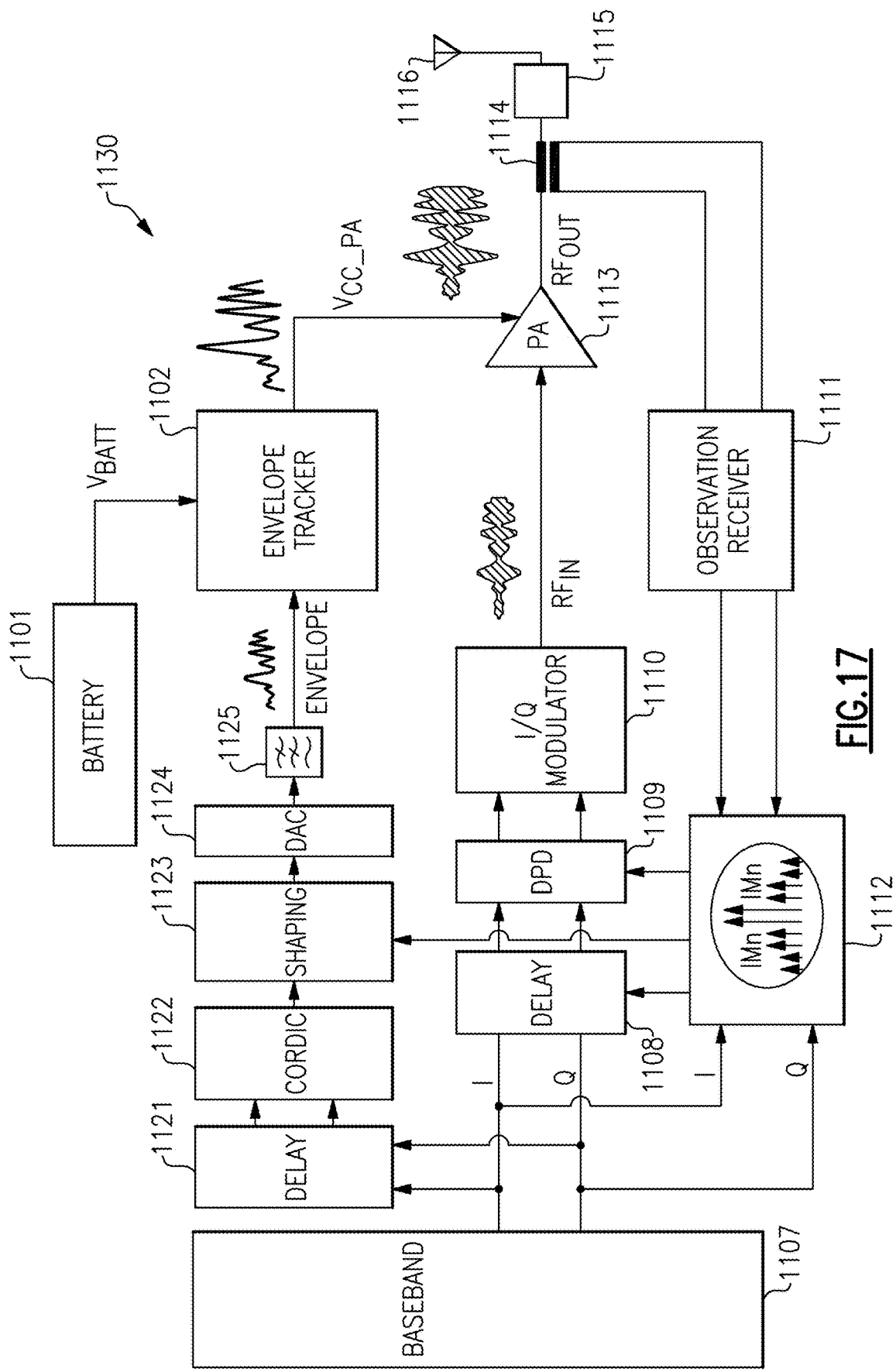
FIG. 17 is a schematic diagram of one embodiment of a communication system for transmitting RF signals.

FIG. 17 is a schematic diagram of one embodiment of a communication system 1130 for transmitting RF signals. The communication system 1130 includes a battery 1101, an envelope tracker 1102, a baseband processor 1107, a signal delay circuit 1108, a digital pre-distortion (DPD) circuit 1109, an I/Q modulator 1110, an observation receiver 1111, an intermodulation detection circuit 1112, a power amplifier 1113, a directional coupler 1114, a duplexing and switching circuit 1115, an antenna 1116, an envelope delay circuit 1121, a coordinate rotation digital computation (CORDIC) circuit 1122, a shaping circuit 1123, a digital-to-analog converter 1124, and a reconstruction filter 1125.

The communication system 1130 of FIG. 17 illustrates one example of an RF system operating with a power amplifier supply voltage controlled using envelope tracking. However, envelope tracking systems can be implemented in a wide variety of ways.

The baseband processor 1107 operates to generate an I signal and a Q signal, which correspond to signal components of a sinusoidal wave or signal of a desired amplitude, frequency, and phase. For example, the I signal can be used to represent an in-phase component of the sinusoidal wave and the Q signal can be used to represent a quadrature-phase component of the sinusoidal wave, which can be an equivalent representation of the sinusoidal wave. In certain implementations, the I and Q signals are provided to the I/Q modulator 1110 in a digital format. The baseband processor 1107 can be any suitable processor configured to process a baseband signal. For instance, the baseband processor 1107 can include a digital signal processor, a microprocessor, a programmable core, or any combination thereof.

The signal delay circuit 1108 provides adjustable delay to the I and Q signals to aid in controlling relative alignment between the envelope signal and the RF signal $RF_{IN}$. The amount of delay provided by the signal delay circuit 1108 is controlled based on amount of intermodulation detected by the intermodulation detection circuit 1112.

The DPD circuit 1109 operates to provide digital shaping to the delayed I and Q signals from the signal delay circuit 1108 to generate digitally pre-distorted I and Q signals. In the illustrated embodiment, the pre-distortion provided by the DPD circuit 1109 is controlled based on amount of intermodulation detected by the intermodulation detection circuit 1112. The DPD circuit 1109 serves to reduce a distortion of the power amplifier 1113 and/or to increase the efficiency of the power amplifier 1113.

The I/Q modulator 1110 receives the digitally pre-distorted I and Q signals, which are processed to generate an RF signal $RF_{IN}$. For example, the I/Q modulator 1110 can include DACs configured to convert the digitally pre-distorted I and Q signals into an analog format, mixers for upconverting the analog I and Q signals to radio frequency, and a signal combiner for combining the upconverted I and Q signals into an RF signal suitable for amplification by the power amplifier 1113. In certain implementations, the I/Q modulator 1110 can include one or more filters configured to filter frequency content of signals processed therein.

The envelope delay circuit 1121 delays the I and Q signals from the baseband processor 1107. Additionally, the CORDIC circuit 1122 processes the delayed I and Q signals to generate a digital envelope signal representing an envelope of the RF signal $RF_{IN}$. Although FIG. 17 illustrates an implementation using the CORDIC circuit 1122, an envelope signal can be obtained in other ways.

The shaping circuit 1123 operates to shape the digital envelope signal to enhance the performance of the communication system 1130. In certain implementations, the shaping circuit 1123 includes a shaping table that maps each level of the digital envelope signal to a corresponding shaped envelope signal level. Envelope shaping can aid in controlling linearity, distortion, and/or efficiency of the power amplifier 1113.

In the illustrated embodiment, the shaped envelope signal is a digital signal that is converted by the DAC 1124 to an analog envelope signal. Additionally, the analog envelope signal is filtered by the reconstruction filter 1125 to generate an envelope signal suitable for use by the envelope tracker 1102. In certain implementations, the reconstruction filter 1125 includes a low pass filter.

With continuing reference to FIG. 17, the envelope tracker 1102 receives the envelope signal from the reconstruction filter 1125 and a battery voltage $V_{BATT}$ from the battery 1101, and uses the envelope signal to generate a power amplifier supply voltage $V_{CC\_PA}$ for the power amplifier 1113 that changes in relation to the envelope of the RF signal $RF_{IN}$. The power amplifier 1113 receives the RF signal $RF_{IN}$ from the I/Q modulator 1110, and provides an amplified RF signal $RF_{OUT}$ to the antenna 1116 through the duplexing and switching circuit 1115, in this example.

The directional coupler 1114 is positioned between the output of the power amplifier 1113 and the input of the duplexing and switching circuit 1115, thereby allowing a measurement of output power of the power amplifier 1113 that does not include insertion loss of the duplexing and switching circuit 1115. The sensed output signal from the directional coupler 1114 is provided to the observation receiver 1111, which can include mixers for down converting I and Q signal components of the sensed output signal, and DACs for generating I and Q observation signals from the downconverted signals.

The intermodulation detection circuit 1112 determines an intermodulation product between the I and Q observation signals and the I and Q signals from the baseband processor 1107. Additionally, the intermodulation detection circuit 1112 controls the pre-distortion provided by the DPD circuit 1109 and/or a delay of the signal delay circuit 1108 to control relative alignment between the envelope signal and the RF signal $RF_{IN}$. In certain implementations, the intermodulation detection circuit 1112 also serves to control shaping provided by the shaping circuit 1123.

By including a feedback path from the output of the power amplifier 1113 and baseband, the I and Q signals can be dynamically adjusted to optimize the operation of the communication system 1130. For example, configuring the communication system 1130 in this manner can aid in providing power control, compensating for transmitter impairments, and/or in performing DPD.

Although illustrated as a single stage, the power amplifier 1113 can include one or more stages. Furthermore, the teachings herein are applicable to communication systems including multiple power amplifiers. In such implementations, separate envelope trackers can be provided for different power amplifiers and/or one or more shared envelope trackers can be used.

Figure 18:
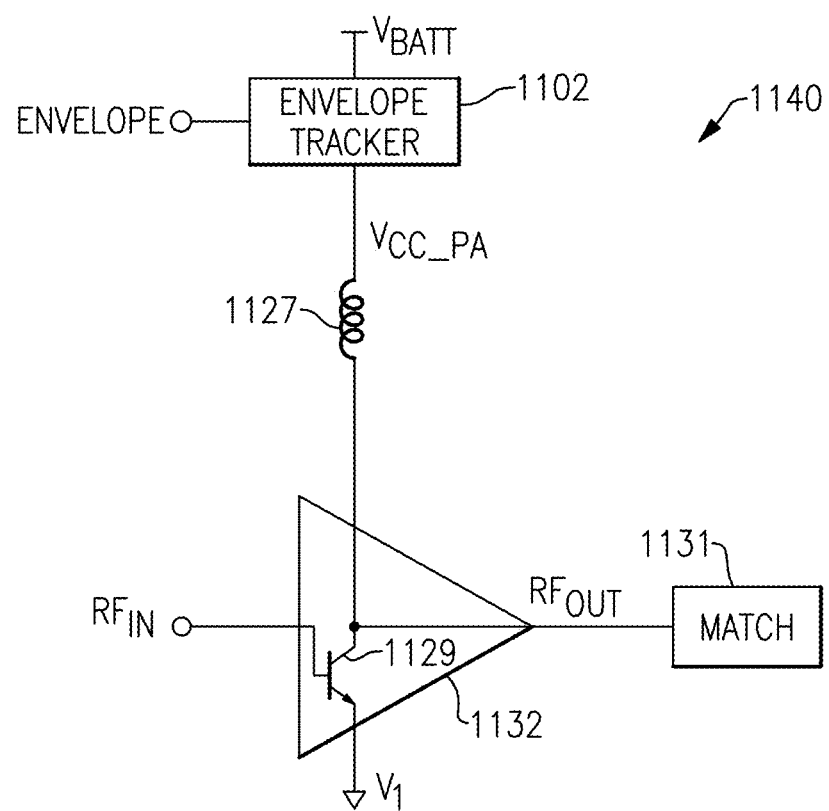
FIG. 18 is a schematic diagram of one example of a power amplifier system including an envelope tracker.

FIG. 18 is a schematic diagram of one example of a power amplifier system 1140 including an envelope tracker 1102. The illustrated power amplifier system 1140 further includes an inductor 1127, an output impedance matching circuit 1131, and a power amplifier 1132. The illustrated envelope tracker 1102 receives a battery voltage $V_{BATT}$ and an envelope of the RF signal and generates a power amplifier supply voltage $V_{CC\_PA}$ for the power amplifier 1132.

The illustrated power amplifier 1132 includes a bipolar transistor 1129 having an emitter, a base, and a collector. As shown in FIG. 18, the emitter of the bipolar transistor 1129 is electrically connected to a power low supply voltage $V_1$, which can be, for example, a ground supply. Additionally, an RF signal ($RF_{IN}$) is provided to the base of the bipolar transistor 1129, and the bipolar transistor 1129 amplifies the RF signal to generate an amplified RF signal at the collector. The bipolar transistor 1129 can be any suitable device. In one implementation, the bipolar transistor 1129 is a heterojunction bipolar transistor (HBT).

The output impedance matching circuit 1131 serves to terminate the output of the power amplifier 1132, which can aid in increasing power transfer and/or reducing reflections of the amplified RF signal generated by the power amplifier 1132. In certain implementations, the output impedance matching circuit 1131 further operates to provide harmonic termination and/or to control a load line impedance of the power amplifier 1132.

The inductor 1127 can be included to provide the power amplifier 1132 with the power amplifier supply voltage $V_{CC\_PA}$ generated by the envelope tracker 1102 while choking or blocking high frequency RF signal components. The inductor 1127 can include a first end electrically connected to the envelope tracker 1102, and a second end electrically connected to the collector of the bipolar transistor 1129. In certain implementations, the inductor 1127 operates in combination with the impedance matching circuit 1131 to provide output matching.

Although FIG. 18 illustrates one implementation of the power amplifier 1132, skilled artisans will appreciate that the teachings described herein can be applied to a variety of power amplifier structures, such as multi-stage power amplifiers and power amplifiers employing other transistor structures. For example, in some implementations the bipolar transistor 1129 can be omitted in favor of employing a field-effect transistor (FET), such as a silicon FET, a gallium arsenide (GaAs) high electron mobility transistor (HEMT), or a laterally diffused metal oxide semiconductor (LDMOS) transistor. Additionally, the power amplifier 1132 can be adapted to include additional circuitry, such as biasing circuitry.

FIGS. 13A and 13B show two examples of power amplifier supply voltage versus time.

Figure 19A:
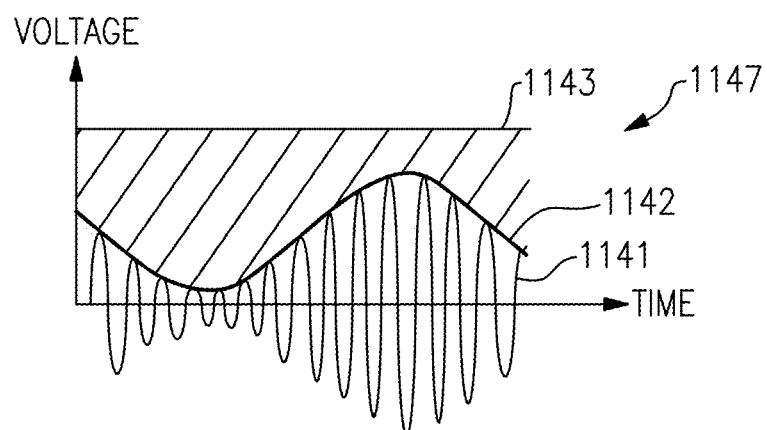
FIG. 19A shows a first example of a power amplifier supply voltage versus time.

In FIG. 19A, a graph 1147 illustrates one example of the voltage of an RF signal 1141 and a power amplifier supply voltage 1143 versus time. The RF signal 1141 has an envelope 1142.

It can be important that the power amplifier supply voltage 1143 of a power amplifier has a voltage greater than that of the RF signal 1141. For example, powering a power amplifier using a power amplifier supply voltage that has a magnitude less than that of the RF signal can clip the RF signal, thereby creating signal distortion and/or other problems. Thus, it can be important the power amplifier supply voltage 1143 be greater than that of the envelope 1142. However, it can be desirable to reduce a difference in voltage between the power amplifier supply voltage 1143 and the envelope 1142 of the RF signal 1141, as the area between the power amplifier supply voltage 1143 and the envelope 1142 can represent lost energy, which can reduce battery life and increase heat generated in a wireless device.

Figure 19B:
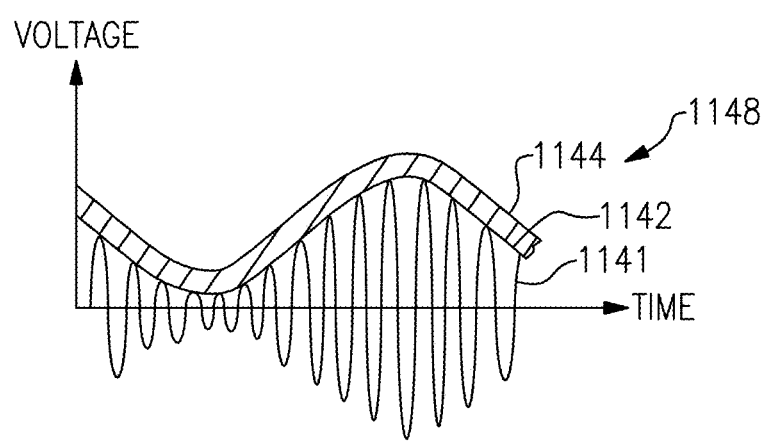
FIG. 19B shows a second example of a power amplifier supply voltage versus time.

In FIG. 19B, a graph 1148 illustrates another example of the voltage of an RF signal 1141 and a power amplifier supply voltage 1144 versus time. In contrast to the power amplifier supply voltage 1143 of FIG. 19A, the power amplifier supply voltage 1144 of FIG. 19B changes in relation to the envelope 1142 of the RF signal 1141. The area between the power amplifier supply voltage 1144 and the envelope 1142 in FIG. 19B is less than the area between the power amplifier supply voltage 1143 and the envelope 1142 in FIG. 19A, and thus the graph 1148 of FIG. 19B can be associated with a power amplifier system having greater energy efficiency.

CONCLUSION

Some of the embodiments described above have provided examples in connection with mobile devices. However, the principles and advantages of the embodiments can be used for any other systems or apparatus that have needs for envelope tracking.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A radio frequency front end system comprising:
   a power amplifier configured to amplify a radio frequency signal to generate a radio frequency output signal, the power amplifier configured to receive power from a power amplifier supply voltage;
   an envelope tracker configured to control a voltage level of the power amplifier supply voltage based on an envelope signal indicating an envelope of the radio frequency signal;
   a radio frequency switch configured to receive the radio frequency output signal;
   a charge pump configured to control a regulated voltage for the radio frequency switch based on the envelope signal; and
   a controllable delay circuit operable to control a delay between the envelope signal arriving to the charge pump and the envelope signal arriving to the envelope tracker, the delay calibrated by calibration data.

2. The radio frequency front end system of claim 1 further comprising a directional coupler configured to generate an observation signal based on observing an output of the power amplifier.

3. The radio frequency front end system of claim 2 further comprising an observation receiver coupled to the radio frequency front end system, the observation receiver configured to generate the calibration data based on the observation signal.

4. The radio frequency front end system of claim 3 wherein the observation receiver is further configured to generate the calibration data based on comparing a first peak of the observation signal to a second peak of the observation signal.

5. The radio frequency front end system of claim 4 wherein the first peak and the second peak are substantially triangular.

6. The radio frequency front end system of claim 4 wherein the observation receiver is further configured to generate the calibration data based on changing the delay until a size of the first peak is substantially equal to a size of the second peak.

7. The radio frequency front end system of claim 1 further comprising a memory storing the calibration data.

8. The radio frequency front end system of claim 1 further comprising a duplexer connected between the power amplifier and the radio frequency switch.

9. A mobile device comprising:
   a transceiver configured to generate a radio frequency signal; and
   a radio frequency front end system including a power amplifier configured to amplify the radio frequency signal to generate a radio frequency output signal, an envelope tracker configured to control a voltage level of a power amplifier supply voltage of the power amplifier based on an envelope signal indicating an envelope of the radio frequency signal, a radio frequency switch configured to receive the radio frequency output signal, a charge pump configured to control a regulated voltage for the radio frequency switch based on the envelope signal, and a controllable delay circuit operable to control a delay between the envelope signal arriving to the charge pump and the envelope signal arriving to the envelope tracker, the delay calibrated by calibration data.

10. The mobile device of claim 9 wherein the radio frequency front end system further includes a directional coupler configured to generate an observation signal based on observing an output of the power amplifier.

11. The mobile device of claim 10 wherein the transceiver further includes an observation receiver configured to generate the calibration data based on the observation signal.

12. The mobile device of claim 11 wherein the observation receiver is further configured to generate the calibration data based on comparing a first peak of the observation signal to a second peak of the observation signal.

13. The mobile device of claim 12 wherein the first peak and the second peak are substantially triangular.

14. The mobile device of claim 12 wherein the observation receiver is further configured to generate the calibration data based on changing the delay until a size of the first peak is substantially equal to a size of the second peak.

15. The mobile device of claim 9 wherein the radio frequency front end system further includes a memory storing the calibration data.

16. The mobile device of claim 9 wherein the radio frequency front end system further includes a duplexer connected between the power amplifier and the radio frequency switch.

17. The mobile device of claim 9 further comprising an antenna configured to transmit the radio frequency output signal.

18. A method of envelope alignment, the method comprising:
    amplifying a radio frequency signal to generate a radio frequency output signal using a power amplifier;
    controlling a voltage level of a power amplifier supply voltage of the power amplifier based on an envelope signal using an envelope tracker, the envelope signal indicating an envelope of the radio frequency signal;
    receiving the radio frequency output signal as an input to a radio frequency switch, the radio frequency switch controlled by a regulated voltage;
    controlling the regulated voltage based on the envelope signal using a charge pump;
    controlling a delay between the envelope signal arriving to the charge pump and the envelope signal arriving to the envelope tracker using a controllable delay circuit; and
    calibrating the delay using calibration data.

19. The method of claim 18 further comprising generating an observation signal based on observing an output of the power amplifier using a directional coupler.

20. The method of claim 19 further comprising generating the calibration data based on the observation signal using an observation receiver.

* * * * *